US012456829B2

(12) United States Patent
Sato et al.

(10) Patent No.: US 12,456,829 B2
(45) Date of Patent: Oct. 28, 2025

(54) CONNECTOR AND ASSEMBLY METHOD OF CONNECTOR

(71) Applicant: Yamaichi Electronics Co., Ltd., Tokyo (JP)

(72) Inventors: Shigeru Sato, Tokyo (JP); Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 386 days.

(21) Appl. No.: 18/074,279

(22) Filed: Dec. 2, 2022

(65) Prior Publication Data

US 2024/0186733 A1 Jun. 6, 2024

(51) Int. Cl.

*H01R 12/73* (2011.01)
*H01R 13/115* (2006.01)
*H01R 13/502* (2006.01)
*H01R 43/20* (2006.01)

(52) U.S. Cl.

CPC ......... *H01R 12/737* (2013.01); *H01R 13/115* (2013.01); *H01R 13/502* (2013.01); *H01R 43/20* (2013.01)

(58) Field of Classification Search

CPC .. H01R 12/737; H01R 13/115; H01R 13/502; H01R 43/20; H01R 13/41; H01R 13/516; H01R 24/58; H01R 12/707; H01R 12/727; H01R 12/735; H01R 12/721; H01R 13/40

See application file for complete search history.

(56) References Cited

U.S. PATENT DOCUMENTS

| | | | | |
|---|---|---|---|---|
| 4,932,885 | A | 6/1990 | Scholz | |
| 9,780,512 | B2 | 10/2017 | Hsu et al. | |
| 10,651,589 | B1 * | 5/2020 | Wang | H01R 12/7052 |
| 2002/0177370 | A1 * | 11/2002 | Abbott | H01R 13/2421 439/700 |
| 2019/0097335 | A1 * | 3/2019 | Kee Mew | H01R 12/58 |
| 2024/0186733 | A1 * | 6/2024 | Sato | H01R 12/735 |

FOREIGN PATENT DOCUMENTS

| | | | |
|---|---|---|---|
| JP | S53-138086 | A | 12/1978 |
| JP | 2011-146210 | A | 7/2011 |

OTHER PUBLICATIONS

Extended European Search Report issued Apr. 29, 2024 in EP Application No. 23193804.4.

* cited by examiner

*Primary Examiner* — Abdullah A Riyami
*Assistant Examiner* — Nader J Alhawamdeh
(74) *Attorney, Agent, or Firm* — Panitch Schwarze Belisario & Nadel LLP

(57) ABSTRACT

A connector that is mounted on an external mount substrate and in or from which an external pluggable substrate is inserted or extracted in an insertion-extraction direction Die includes: pin groups each including a plurality of aligned contact pins; an outer housing holding the pin groups and a frame attached to the outer housing. The outer housing has a main body and a protruding part which protrudes in the insertion-extraction direction Die from the main body and in which a slot opening in or from which the pluggable substrate is inserted or extracted is formed. The frame surrounds the whole circumference of the protruding part and is installed on an installation surface of the main body substantially orthogonal to the insertion-extraction direction Die.

15 Claims, 26 Drawing Sheets

CONNECTOR AND ASSEMBLY METHOD OF CONNECTOR

BACKGROUND

1. Technical Field

The present invention relates to a connector and an assembly method of a connector.

2. Description of Related Art

Some receptacle connectors mounted on a mount substrate have a plurality of pin groups each having a plurality of contact pins and a housing holding these pin groups.

In such connectors, for example, a first pin group and a second pin group are arranged so as to face each other with a predetermined spacing therebetween and are configured such that, when a plug connector is connected to a receptacle connector, the plug connector substrate is inserted between the first pin group and the second pin group (as in, for example, U.S. Pat. No. 9,780,512 and Japanese Patent Application Laid-Open No. 2011-146210).

When a substrate is inserted, a movable piece of each contact pin of the first pin group and a movable piece of each contact pin of the second pin group come into contact with the substrate and are deformed in a direction away from each other. At this time, a portion near the supporting point of each movable piece in contact with an inner wall surface of the housing applies outward force against walls of the housing.

Accordingly, the wall of the housing is bent and deformed so as to expand outward by force applied from the movable pieces. In particular, when walls facing each other are not connected to each other (for example, when it is required to form a space for accommodating another component inside the housing), the walls of the housing are more likely to be deformed by the force applied from the movable pieces. Further, such deformation of the walls of the housing may reduce a contact load of each contact pin on the substrate, and this may not be able to acquire desired contact performance.

Accordingly, the present invention intends to provide a connector and an assembly method of a connector having a reinforced housing in order to reduce deformation of a housing and achieve good contact performance of contact pins.

BRIEF SUMMARY

To solve the above problem, the connector and the assembly method of the connector of the present invention employ the following solutions.

A connector according to the first aspect of the present invention is a connector that is mounted on an external first substrate and in or from which an external second substrate is inserted or extracted in an insertion-extraction direction, and the connector includes: a pin group in which a plurality of contact pins are aligned; a housing holding the pin group; and a reinforcing member attached to the housing. The housing has a main body and a protruding part protruding in the insertion-extraction direction from the main body, a slot opening in or from which the second substrate is inserted or extracted being formed in the protruding part, and the reinforcing member has a plate-like frame part surrounding a whole circumference of the protruding part and installed on a surface of the main body, the surface being substantially orthogonal to the insertion-extraction direction.

According to the connector of the present aspect, since the reinforcing member has a plate-like frame part surrounding the protruding part over the entire circumference, deformation of the protruding part that is a part of the housing (deformation in the direction substantially orthogonal to the insertion-extraction direction) can be reduced by the frame part. Further, because deformation of the protruding part is reduced, deformation of the main body connected to the protruding part is also reduced, and as a result, the overall housing will be reinforced. Further, because deformation of the housing is reduced, a reduction in the contact load of each contact pin on the second substrate can be controlled, and therefore, good contact performance of the connector can be achieved.

Further, since the frame part of the reinforcing member is installed on the surface of the main body substantially orthogonal to the insertion-extraction direction, the frame part can be easily attached to the housing.

Further, while the surface of the main body to which the frame part is installed is present around the protruding part, the frame part does not cause an increase in size of the connector when the shape of the frame part is designed to be substantially the same as the surface of the main body. In other words, a compact, thin connector can be achieved. If the frame part were attached to the outer circumferential surface of the main body, the connector would be increased in size for the thickness of the frame part.

For a connector according to the second aspect of the present invention, in reference to the first aspect, the reinforcing member has a plate-like side part extending along the side surface of the main body, a base end of the side part is connected to the frame part, and a tab to be connected to the first substrate is formed on a free end of the side part.

According to the connector of the present aspect, since the reinforcing member has the side part and a tab is formed on the free end of the side part, it is possible to firmly connect the connector to the first substrate by connecting the tab to the first substrate.

Further, when the second substrate is extracted out of the connector, it may be possible to prevent the connecting part between each mount part of each contact pin and the first substrate from being damaged by the application of force in the direction in which the connector is lifted up away from the first substrate.

For a connector according to the third aspect of the present invention, in reference to the second aspect, the reinforcing member is made of a metal, and the tab is soldered to the first substrate.

According to the connector of the present aspect, since the tab is soldered to the first substrate, it is possible to firmly join the connector to the first substrate by joining the tab to the first substrate.

For a connector according to the fourth aspect of the present invention, in reference to the third aspect, at least one hole is formed in the side part.

According to the connector of the present aspect, since at least one hole is formed in the side part, when the tab is soldered to the first substrate, the amount of heat transferred from the tab to the frame part via the side part can be reduced. Thus, the holes are provided to reduce the sectional area of the side wall part as a heat transfer path.

For a connector according to the fifth aspect of the present invention, in reference to any one of the first aspect to the third aspect, a position of the frame part corresponds to a position near a portion of the contact pin press-fitted in the housing in the insertion-extraction direction.

According to the connector of the present aspect, the position of the frame part corresponds to a position near a portion of the contact pin press-fitted in the housing in the insertion-extraction direction. This can reinforce the portion of the housing that is most significantly subjected to the force from the contact pin.

For a connector according to the sixth aspect of the present invention, in reference to any one of the first aspect to the fifth aspect, the frame part has a square shape having four sides, and a transverse sectional shape of each of the sides is a rectangular shape that is longer in a direction substantially orthogonal to the insertion-extraction direction.

According to the connector of the present aspect, since the transverse sectional shape of each side of the frame part is a rectangular shape that is longer in the direction substantially orthogonal to the insertion-extraction direction, the second moment of area in a direction in which the housing may be deformed can be effectively improved. Thus, the housing can be reinforced.

For a connector according to the seventh aspect of the present invention, in reference to any one of the first aspect to the sixth aspect, the pin group includes a first pin group, a second pin group, a third pin group, and a fourth pin group, the housing includes an outer housing in which the first pin group and the second pin group facing each other are held by press-fitting and an inner housing in which the third pin group and the fourth pin group facing each other are held by press-fitting, the inner housing is accommodated in the outer housing, and the outer housing has the protruding part and the main body.

According to the connector of the present aspect, the outer housing in which the first pin group and the second pin group facing each other are held by press-fitting and the inner housing in which the third pin group and the fourth pin group facing each other are held by press-fitting are provided, and the inner housing is accommodated in the outer housing. Thus, the manufacturing cost of the connector can be reduced compared to a case where respective pin groups are inserted without the housing being divided, for example. Further, the connector can be manufactured relatively simply.

Further, since a space for accommodating the first pin group and the second pin group and the inner housing is formed inside the outer housing, the wall of the outer housing has low rigidity and is likely to be deformed. However, such deformation can be reduced by the frame part of the reinforcing member.

A connector according to the eighth aspect of the present invention, in reference to the seventh aspect, includes a plate-like fixing tab provided between the outer housing and the inner housing, and a first claw fixed to the outer housing and a second claw fixed to the inner housing are formed on the fixing tab.

According to the connector of the present aspect, since the first claw fixed to the outer housing and the second claw fixed to the inner housing are formed on the fixing tab, the outer housing and the inner housing can be fixed to each other by the fixing tab (in detail, the first claw and the second claw).

For a connector according to the ninth aspect of the present invention, in reference to the eighth aspect, a tab to be connected to the first substrate is formed on the fixing tab.

According to the connector of the present aspect, since the tab to be connected to the first substrate is formed on the fixing tab, the connector can be firmly connected to the first substrate by the fixing tab.

Further, two functions of the function of fixing the outer housing and the inner housing to each other and the function of firmly connecting the connector to the substrate can be achieved by the single fixing tab. This can reduce the number of components and thus leads to a reduction in the production cost.

For a connector according to the tenth aspect of the present invention, in the reference to ninth aspect, the fixing tab is made of a metal, and the tab is soldered to the first substrate.

According to the connector of the present aspect, since the tab is soldered to the first substrate, it is possible to firmly join the connector to the first substrate by joining the tab to the first substrate.

A connector according to the eleventh aspect of the present invention includes: a first pin group, a second pin group, a third pin group, and a fourth pin group each including a plurality of aligned contact pins; an outer housing in which the first pin group and the second pin group facing each other are held by press-fitting; and an inner housing in which the third pin group and the fourth pin group facing each other are held by press-fitting, and the inner housing is accommodated in the outer housing.

According to the connector of the present aspect, the connector includes the outer housing in which the first pin group and the second pin group facing each other are held by press-fitting and the inner housing in which the third pin group and the fourth pin group facing each other are held by press-fitting, and the inner housing is accommodated in the outer housing. Thus, the manufacturing cost of the connector can be reduced compared to a case where respective pin groups are inserted without the housing being divided, for example. Further, the connector can be manufactured relatively, simply.

A connector according to the twelfth aspect of the present invention, in reference to the eleventh aspect, includes a plate-like fixing tab provided between the outer housing and the inner housing, and a first claw fixed to the outer housing and a second claw fixed to the inner housing are formed on the fixing tab.

According to the connector of the present aspect, since the first claw fixed to the outer housing and the second claw fixed to the inner housing are formed on the fixing tab, the outer housing and the inner housing can be fixed to each other by the fixing tab (in detail, the first claw and the second claw).

For a connector according to the thirteenth aspect of the present invention, in reference to the twelfth aspect, a tab to be connected to the first substrate is formed on the fixing tab.

According to the connector of the present aspect, since the fixing tab is made of a metal and a tab to be connected to the first substrate is formed on the fixing tab, the connector can be firmly connected to the first substrate by the tab formed on the fixing tab.

Further, two functions of the function of fixing the outer housing and the inner housing to each other and the function of firmly connecting the connector to the substrate can be achieved by the single fixing tab. This can reduce the number of components and thus leads to a reduction in the production cost.

For a connector according to the fourteenth aspect of the present invention, in reference to the thirteenth aspect, the fixing tab is made of a metal, and the tab is soldered to the first substrate.

According to the connector of the present aspect, since the tab is soldered to the first substrate, it is possible to firmly join the connector to the first substrate by joining the tab formed on the fixing tab to the first substrate.

An assembly method of a connector according to the fifteenth aspect of the present invention is an assembly method of a connector including a first pin group, a second pin group, a third pin group, and a fourth pin group each including a plurality of aligned contact pins, an outer housing holding the first pin group and the second pin group facing each other, and an inner housing holding the third pin group and the fourth pin group facing each other, and the assembly method includes: press-fitting the first pin group and the second pin group in the outer housing; press-fitting the third pin group and the fourth pin group in the inner housing; and inserting the inner housing holding the third pin group and the fourth pin group in the outer housing holding the first pin group and the second pin group.

DETAILED DESCRIPTION

First Embodiment

A connector and an assembly method of a connector according to a first embodiment of the present invention will be described with reference to the drawings.

Note that, while an insertion-extraction direction Die, a width direction Dw, and a height direction Dh used in the following description are the name based on the position (attitude) in FIG. 1 or FIG. 2 as a reference but are not intended to limit the position (attitude) in a system in actual usage form.

<Overview>

Figure 1:
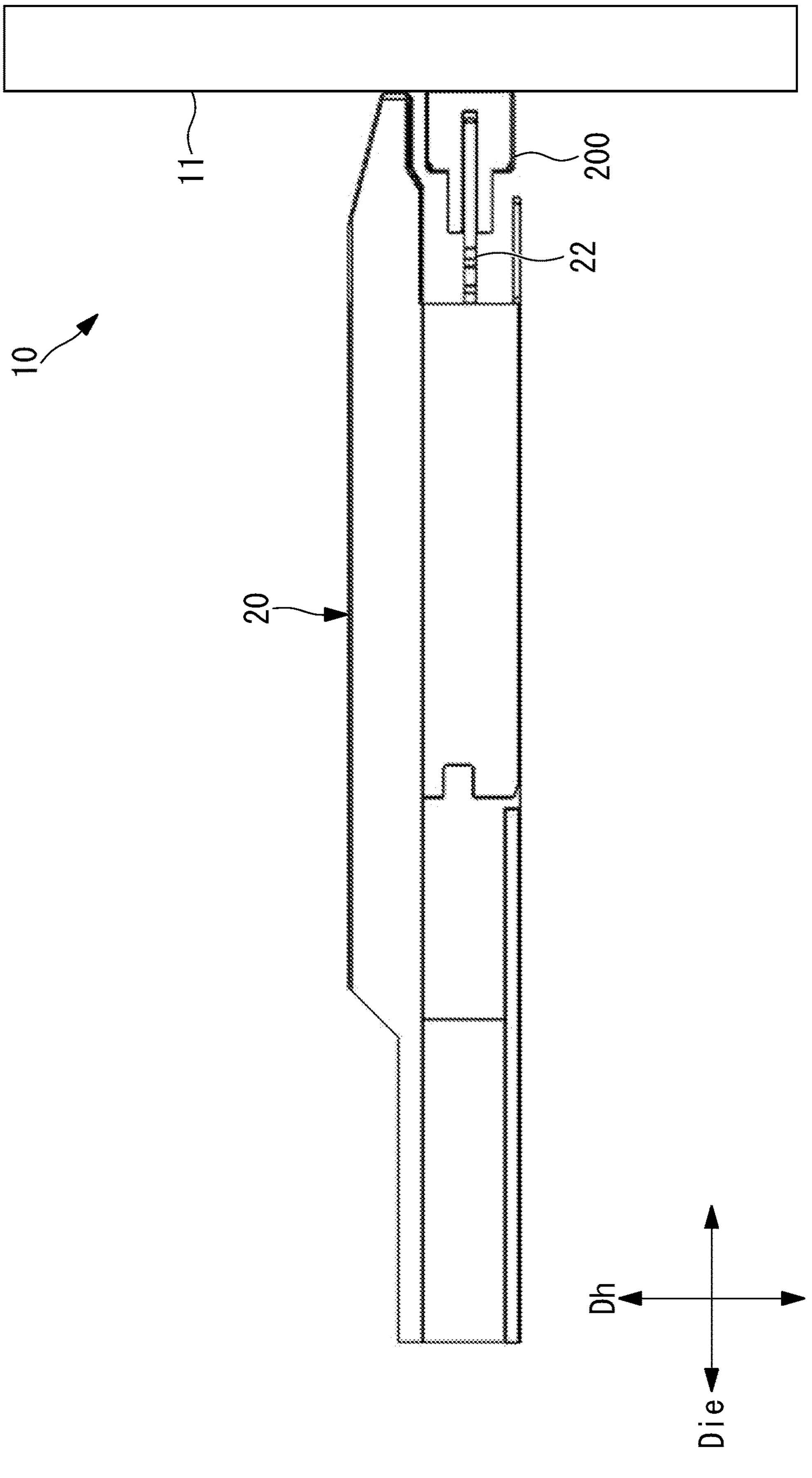
FIG. 1 is a schematic diagram of a communication system.
Figure 2:
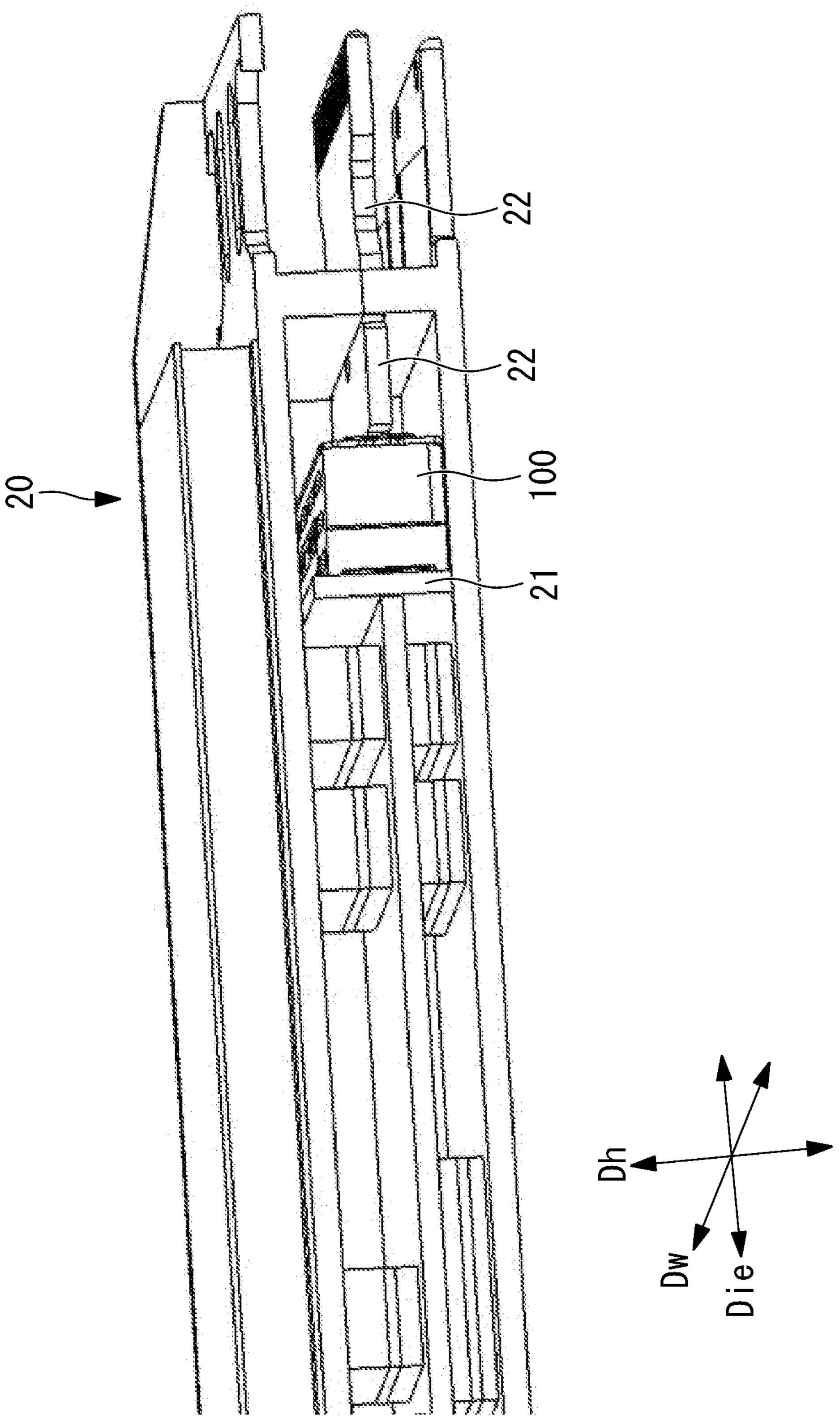
FIG. 2 is a sectional perspective view of a pluggable module.

As illustrated in FIG. 1 and FIG. 2, a connector 100 of the present embodiment is a receptacle connector provided inside a pluggable module 20 connected to a connector 200 mounted on a mount substrate 11 of a communication system 10.

The pluggable module 20 is an optical transceiver such as OSFP, OSFP-XD, or the like, for example.

The pluggable module 20 has a mount substrate 21 (a first substrate), the connector 100 mounted on the mount substrate 21, and a pluggable substrate 22 (a second substrate).

As illustrated in FIG. 2, the mount substrate 21 (first substrate) and the connector 100 are arranged in the internal space of the pluggable module 20.

The pluggable substrate 22 has one end inserted in the connector 100 present in the internal space of the pluggable module 20 and the other end located on the tip side of the pluggable module 20 directed outward from the internal space (the right direction in the insertion-extraction direction Die in FIG. 2).

As illustrated in FIG. 1, the other end of the pluggable substrate 22 is inserted in the connector 200 mounted on the mount substrate 11.

Note that insertion and extraction of the pluggable substrate 22 to and from the connector 200 is made by moving the pluggable module 20 in the insertion-extraction direction Die.

<Connector 100>

As illustrated in FIG. 2, the connector 100 is a component (a receptacle connector) in which the pluggable substrate 22 is inserted in the insertion-extraction direction Die.

Figure 3:
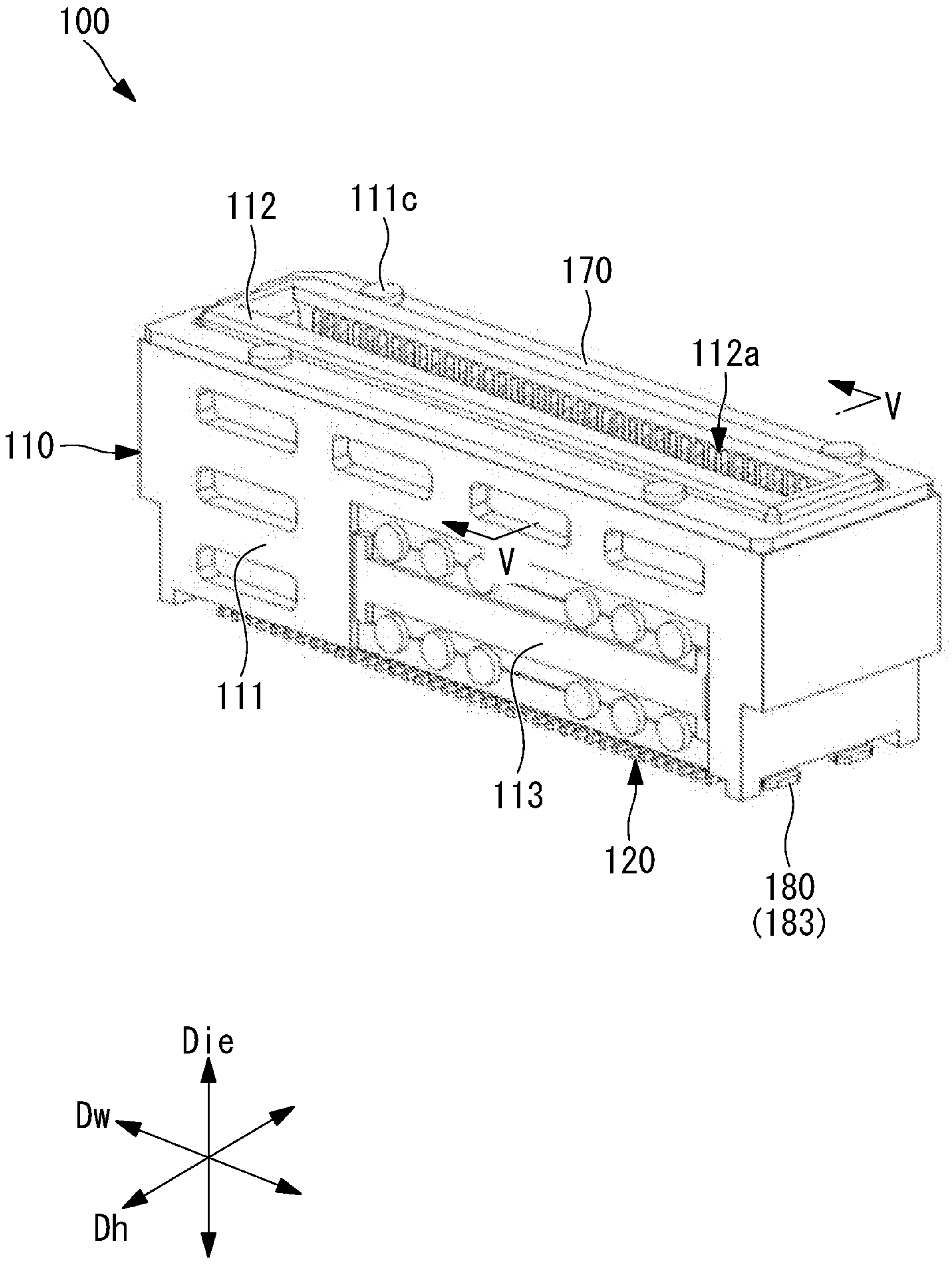
FIG. 3 is a perspective view of a connector according to a first embodiment.
Figure 4:
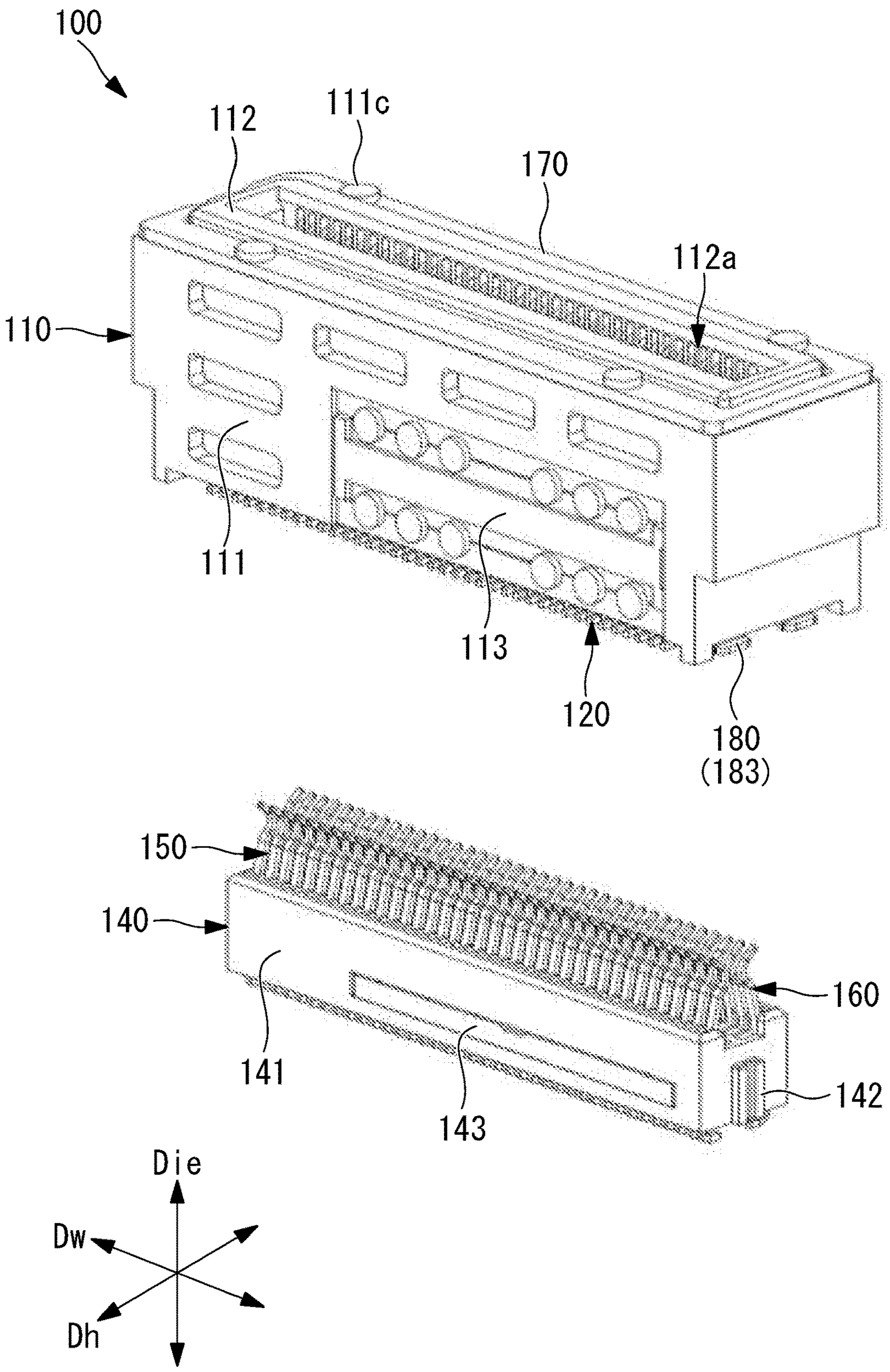
FIG. 4 is an exploded perspective view of a connector according to the first embodiment.
Figure 5:
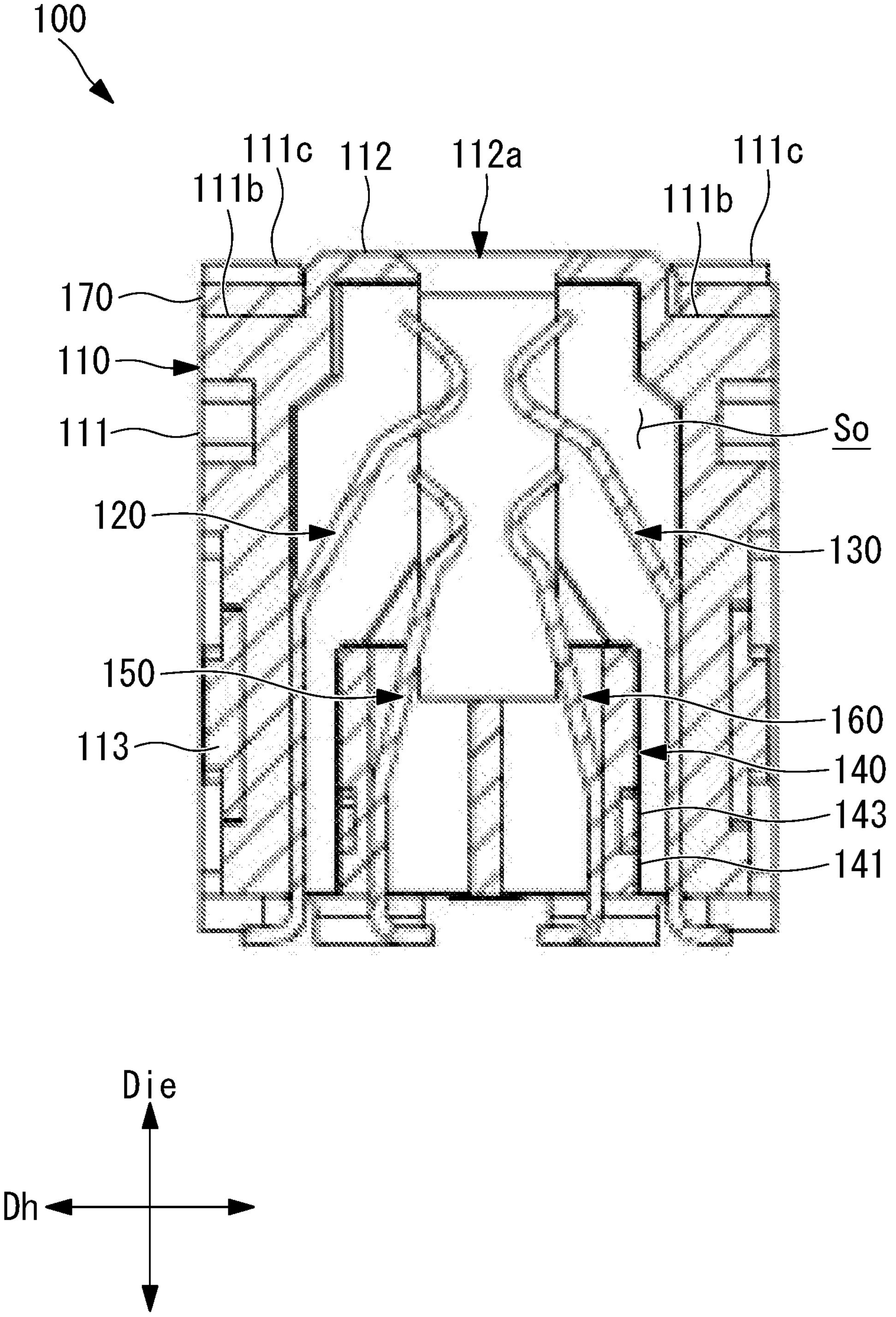
FIG. 5 is a longitudinal sectional view taken along a cutting line V-V illustrating FIG. 3.

As illustrated in FIG. 3 and FIG. 4, the connector 100 has an outer housing 110, a first pin group 120, a second pin group 130, an inner housing 140, a third pin group 150, a fourth pin group 160, and a frame 170 (a reinforcing member) and is configured such that, as illustrated in FIG. 5, the inner housing 140 holding the third pin group 150 and the fourth pin group 160 is accommodated in the outer housing 110 holding the first pin group 120 and the second pin group 130.

<<Outer Housing>>

Figure 6:
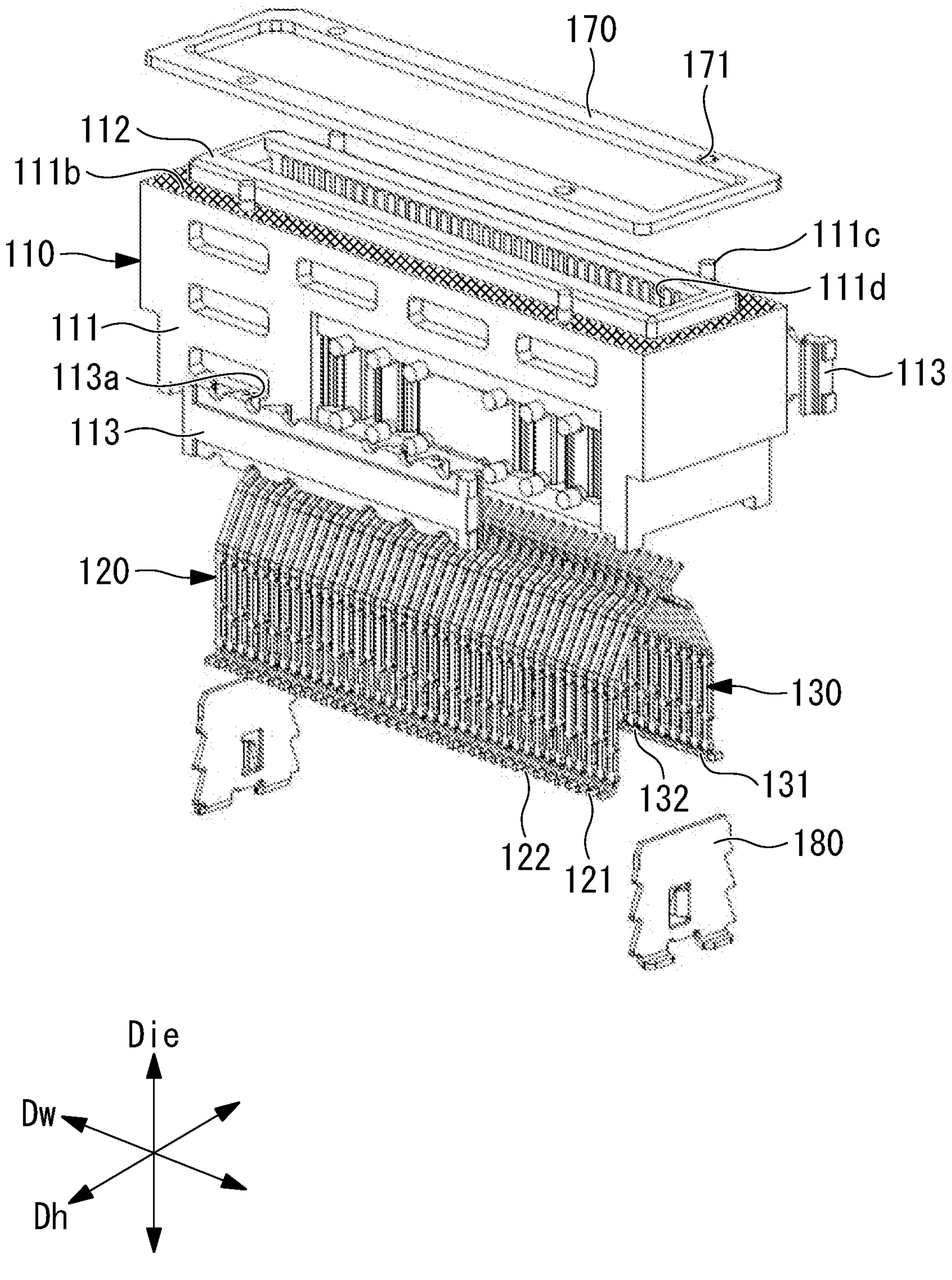
FIG. 6 is an exploded perspective view of an outer housing, a pin group, a mold, a frame, a fixing tab.

As illustrated in FIG. 5 and FIG. 6, the outer housing 110 is a casing having a main body 111 and a protruding part 112 and including a space So defined therein.

Figure 7:
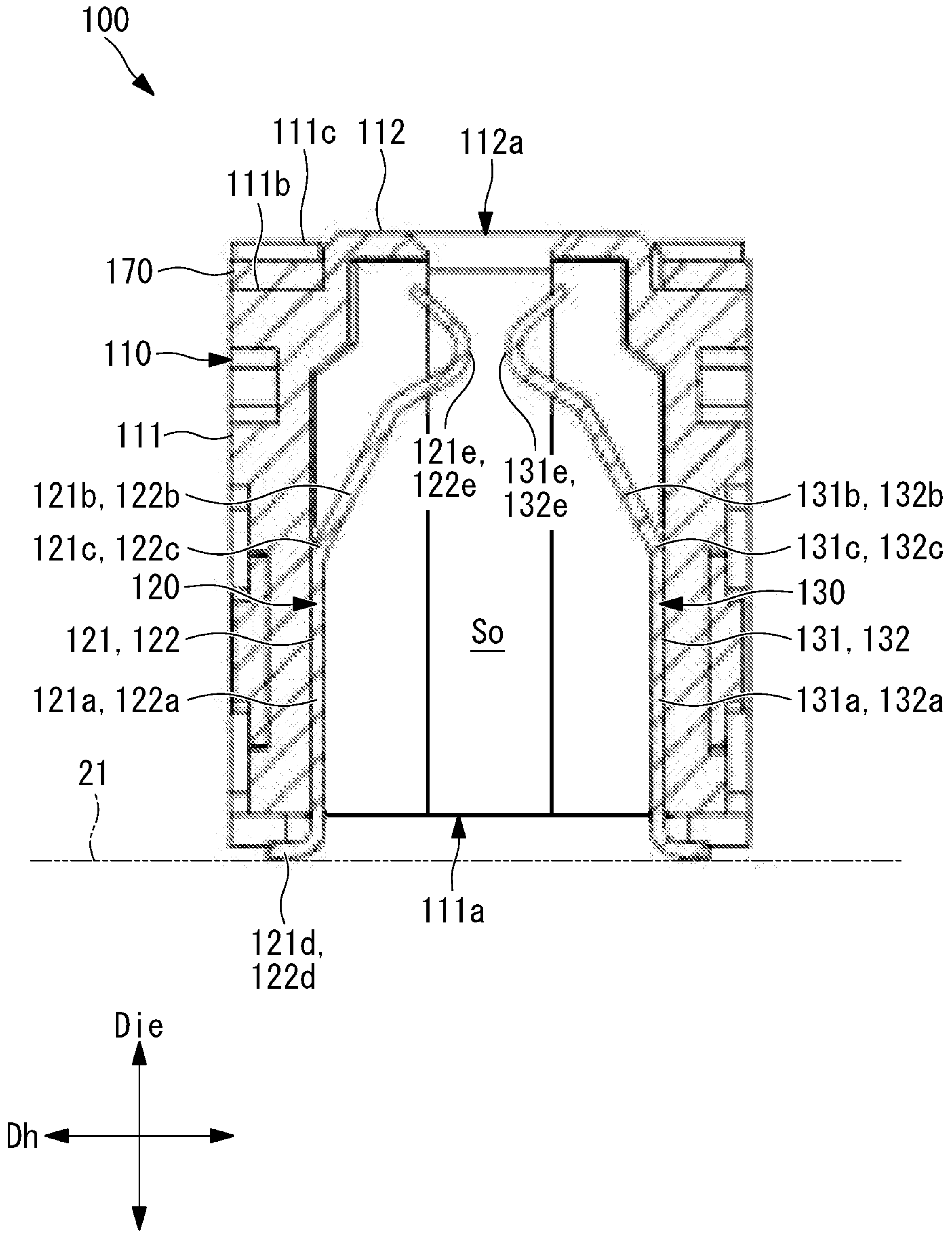
FIG. 7 is a longitudinal sectional view of the outer housing assembly.

As illustrated in FIG. 6 and FIG. 7, the main body 111 is a portion whose external shape is substantially a rectangular parallelepiped.

The main body 111 is molded from an insulating material, for example.

A bottom opening 111*a* communicating with the space So is formed in a surface facing the mount substrate 21 of the main body 111.

On the other hand, the protruding part 112 in which a slot opening 112*a* communicating with the space So is formed in a surface on the opposite side from a surface in which the bottom opening 111*a* is formed.

The protruding part 112 is a portion protruding from the main body 111 in the insertion-extraction direction Die and is located in substantially the center region of the main body 111 when the connector 200 is viewed from the insertion-extraction direction Die. In other words, when the connector 200 is viewed from the insertion-extraction direction Die, the main body 111 is present around the protruding part 112.

In the present embodiment, the protruding amount of the protruding part 112 (the dimension in the insertion-extraction direction Die) is about 0.2 mm to 0.7 mm.

However, the protruding amount is not limited to this numerical value and can be changed as appropriate in accordance with a specification.

The surface of the main body 111 orthogonal to the insertion-extraction direction Die present around the protruding part 112 is defined as an installation surface 111*b*, and the frame 170 described later is installed thereon. In FIG. 6, the installation surface 111*b* is illustrated by cross-hatching.

The installation surface 111*b* is provided with a plurality of pins 111*c* extending in the insertion-extraction direction Die.

As illustrated in FIG. 6, molds 113 are provided on two side surfaces of the main body 111. Each of the molds 113 is a member having predetermined electrical conductivity and is molded from a resin in which conductive particles are dispersed, an anti-static resin, or the like, for example. The "predetermined electrical conductivity" as used herein is, for example, 10 S/m or higher and 200 S/m or lower, preferably, 30 S/m or higher and 150 S/m or lower.

For example, when reference is made to the front mold 113 illustrated in FIG. 6, a plurality of protrusions 113*a* extending in the insertion-extraction direction Die are provided on the mold 113 and configured to be electrically connected to a predetermined ground pin 122 (described later) of the first pin group 120 and a predetermined ground pin 122 (described later) of the second pin group 130. Accordingly, since electromagnetic noise can be absorbed, a good signal transmission property can be achieved. The "predetermined ground pin" as used herein refers to a ground pin corresponding to a differential pair of signal pins to which a high speed signal is transmitted. Thus, in FIG. 6, for example, the mold 113 covers a partial range of the width direction Dw of the main body 111 (the range covered with the mold 113 is a range corresponding to the signal pins to which a high speed signal is transmitted).

The protrusion 113*a* of the mold 113 may be in physical contact with the ground pins 122 and 132, or a slight clearance may be provided between the protrusion 113*a* and the ground pins 122 and 132.

The "slight clearance" as used herein is a clearance having separation at a distance that enables electrical connection of high frequency waves above 1 GHz and ranges from 0.05 mm or higher and 0.1 mm or lower, for example.

As illustrated in FIG. 6, the first pin group 120 has contact pins aligned in the width direction Dw. The contact pins include signal pins 121 (contact pins) and ground pins 122 (contact pins).

The second pin group 130 has contact pins aligned in the width direction Dw. The contact pins include signal pins 131 (contact pins) and ground pins 132 (contact pins).

The first pin group 120 and the second pin group 130 are arranged so as to face each other with a predetermined spacing therebetween in the height direction Dh.

Figure 8:
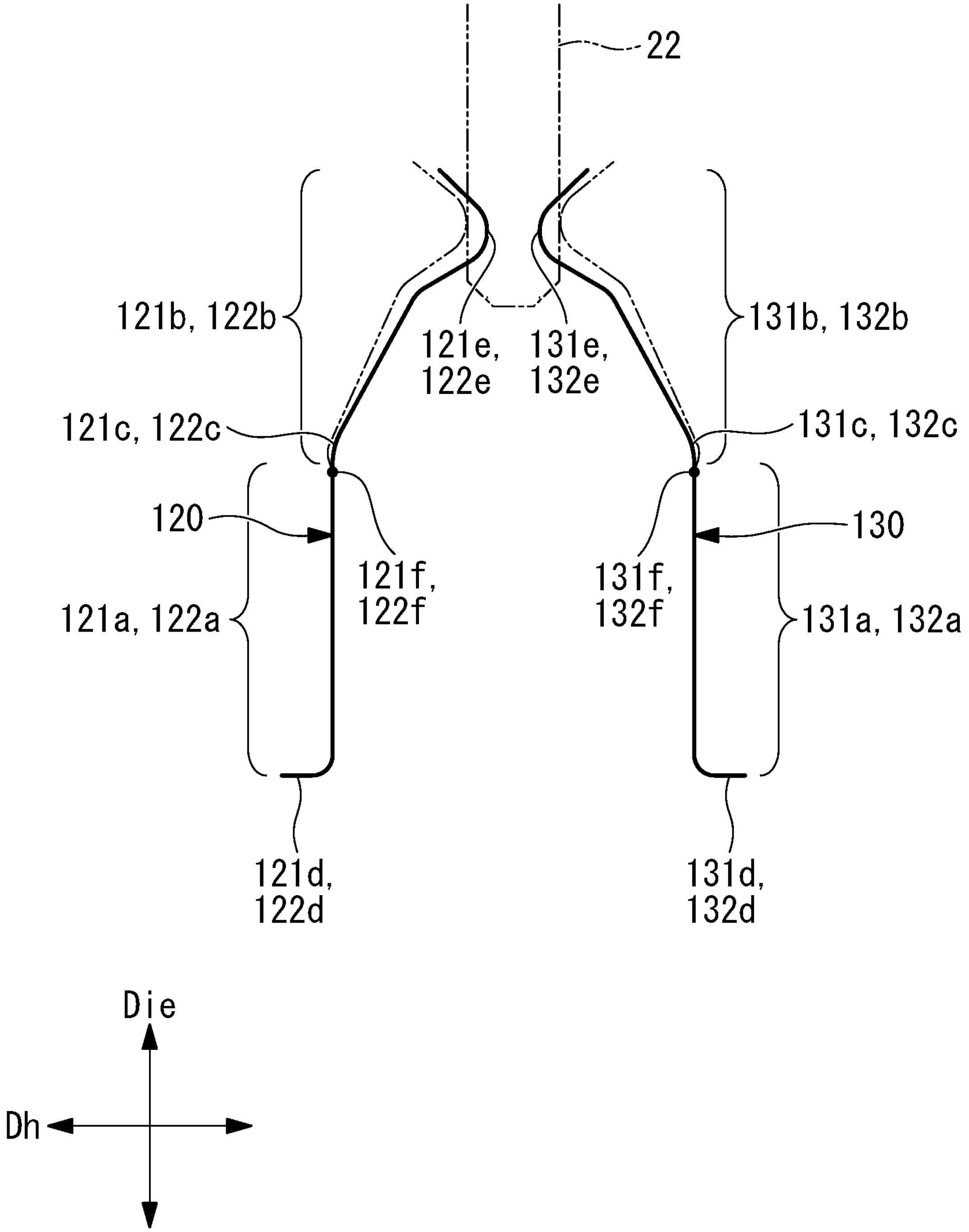
FIG. 8 is a side view of a contact pin held by the outer housing.

As illustrated in FIG. 7 and FIG. 8, when the signal pin 121 is described as an example of a contact pin, for example, the signal pin 121 is a conductive member to ensure conduction between the mount substrate 21 and the pluggable substrate 22 and has a stationary piece 121*a* and a movable piece 121*b*.

As illustrated in FIG. 8, the stationary piece 121*a* is a piece from the terminal end (pin base end) of a mount part 121*d* to a press-fit fixing part 121*f* and includes the mount part 121*d* and the press-fit fixing part 121*f*.

The mount part 121*d* is a portion connected (soldered) to the mount substrate 21 and faces outward.

The press-fit fixing part 121*f* is a portion press-fitted in a groove 111*d* (see FIG. 6) formed in an inner wall of the main body 111. In FIG. 8, the press-fit fixing part 121*f* is indicated by a black circle. The press-fit fixing part 121*f* is provided at a position closer to the mount part 121*d* than an inflection part 121*c* described later. The press-fit fixing part 121*f* is formed in a stationary piece 121*a* and forms a protrusion protruding in the width direction Dw, for example.

Note that the number of press-fit fixing parts 121*f* is not necessarily one, and a plurality of press-fit fixing parts 121*f* may be provided in a range of the signal pin 121 located closer to the mount part 121*d* than the inflection part 121*c*.

As illustrated in FIG. 6, a plurality of grooves 111*d* (the number of which corresponds to the number of contact pins) each extending in the insertion-extraction direction Die are provided over the width direction Dw.

The press-fit fixing part 121*f* of the stationary piece 121*a* is press-fitted in the groove 111*d*, and thereby the signal pin 121 is held by the outer housing 110.

The movable piece 121*b* is a piece from the press-fit fixing part 121*f* to the end (pin tip) on a contact part 121*e* side and includes the inflection part 121*c* and the contact part 121*e*.

Note that the above expression of (a piece) "from the press-fit fixing part 121*f*" in the description of the movable piece 121*b* means in detail that the piece does not include the press-fit fixing part 121*f* and starts from a portion closer to the pin tip adjacent to the press-fit fixing part 121*f*. Thus, the press-fit fixing part 121*f* is a boundary between the stationary piece 121*a* and the movable piece 121*b* and is included in the stationary piece 121*a*. Further, when a plurality of press-fit fixing parts 121*f* are present, the boundary between the stationary piece 121*a* and the movable piece 121*b* is defined as the press-fit fixing part 121*f* that is the closest to the pin tip.

The contact part 121*e* is a portion in contact with the pluggable substrate 22 and curved so as to be convex inward.

The unloaded movable piece 121*b* is inclined inward by the inflection part 121*c* and is deformed so as to be opened outward when the pluggable substrate 22 is inserted in the connector 100. Note that, in FIG. 8, the deformed movable piece 121*b* is represented by the two-dot chain line.

In the same manner as the signal pin 121 of the first pin group 120, the signal pin 131 of the second pin group 130 also has a stationary piece 131*a* including a mount part 131*d* and a press-fit fixing part 131*f* and a movable piece 131*b* including an inflection part 131*c* and a contact part 131*e*.

Further, in the same manner as the signal pin 121 of the first pin group 120, the ground pin 122 of the first pin group 120 also has a stationary piece 122*a* including a mount part 122*d* and a press-fit fixing part 122*f* and a movable piece 122*b* including an inflection part 122*c* and a contact part 122*e*.

Further, in the same manner as the signal pin 121 of the first pin group 120, the ground pin 132 of the second pin group 130 also has a stationary piece 132*a* including a mount part 132*d* and a press-fit fixing part 132*f* and a movable piece 132*b* including an inflection part 132*c* and a contact part 132*e*.

<<Inner Housing>>

Figure 9:
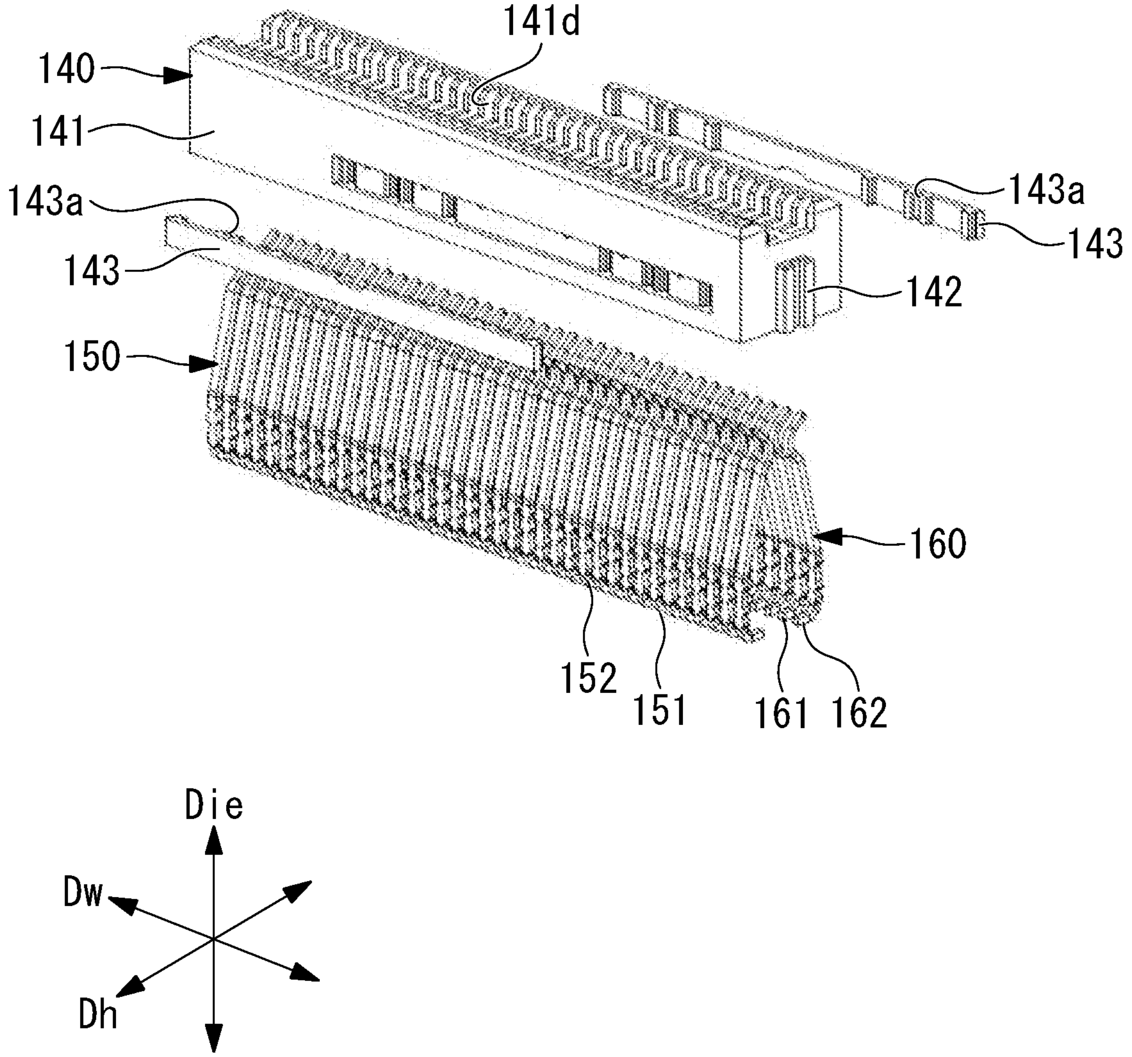
FIG. 9 is an exploded perspective view of an inner housing, a pin group, and a mold.

As illustrated in FIG. 9, the inner housing 140 is a casing having a main body 141.

The main body 141 is a portion whose external shape is substantially a rectangular parallelepiped.

The main body 141 is molded from an insulating material, for example.

Molds 143 are provided on two side surfaces of the main body 141. Each of the molds 143 is a member having predetermined electrical conductivity and is molded from a resin in which conductive particles are dispersed, an anti-static resin, or the like, for example. The "predetermined electrical conductivity" as used herein is, for example, 10 S/m or higher and 200 S/m or lower, preferably, 30 S/m or higher and 150 S/m or lower.

For example, when reference is made to the backside mold 143 illustrated in FIG. 9, a plurality of protrusions 143*a* extending in the insertion-extraction direction Die are provided on the mold 143 and configured to be electrically connected to a predetermined ground pin 152 (described later) of the third pin group 150 and a predetermined ground pin 162 (described later) of the fourth pin group 160. Accordingly, since electromagnetic noise can be absorbed, a good signal transmission property can be achieved. The "predetermined ground pin" as used herein refers to a ground pin corresponding to a differential pair of signal pins to which a high speed signal is transmitted. Thus, in FIG. 9, for example, the mold 143 covers a partial range of the width direction Dw of the main body 141 (the range covered with the mold 143 is a range corresponding to the signal pins to which a high speed signal is transmitted).

A pair of protrusion parts 142 are provided on two other side surfaces of the main body 141.

A narrow groove along the insertion-extraction direction Die defined by the protrusion part 142 is used for fixing to the fixing tab 180. Details will be described later.

As illustrated in FIG. 9, the third pin group 150 has contact pins aligned in the width direction Dw. The contact pins include signal pins 151 (contact pins) and ground pins 152 (contact pins).

The fourth pin group 160 has contact pins aligned in the width direction Dw. The contact pins include signal pins 161 (contact pins) and ground pins 162 (contact pins).

As illustrated in FIG. 5, the third pin group 150 and the fourth pin group 160 are located between the first pin group 120 and the second pin group 130 and arranged so as to face each other with a predetermined spacing therebetween in the height direction Dh.

Figure 10:
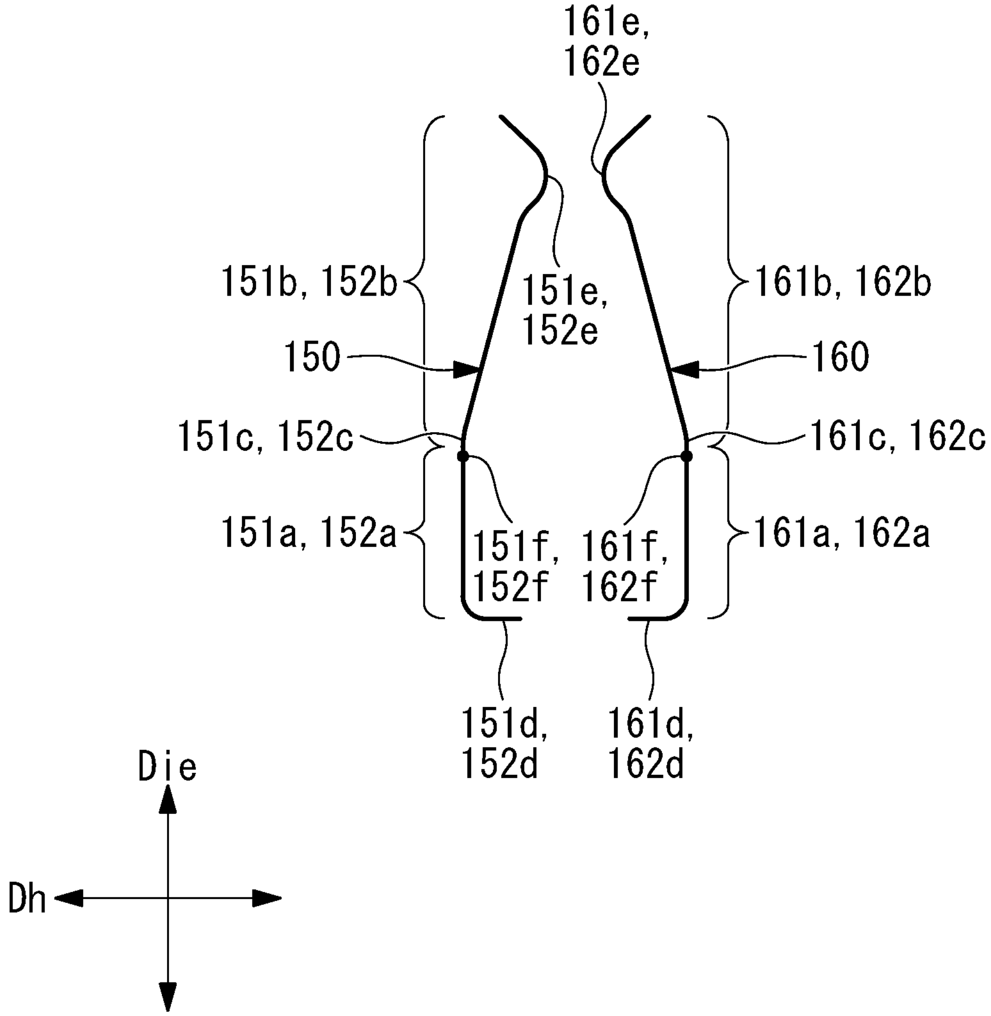
FIG. 10 is a side view of a contact pin held in the inner housing.

As illustrated in FIG. 5 and FIG. 10, when the signal pin 151 is described as an example of a contact pin, for example, the signal pin 151 is a conductive member to ensure conduction between the mount substrate 21 and the pluggable substrate 22 and has a stationary piece 151*a* and a movable piece 151*b*.

As illustrated in FIG. 10, the stationary piece 151*a* is a piece from the terminal end (pin base end) of a mount part 151*d* to a press-fit fixing part 151*f* and includes the mount part 151*d* and the press-fit fixing part 151*f*.

The mount part 151*d* is a portion connected (soldered) to the mount substrate 21 and faces inward.

The press-fit fixing part 151*f* is a portion press-fitted in a groove 141*d* (see FIG. 9) formed in an inner wall of the main body 141. In FIG. 10, the press-fit fixing part 151*f* is indicated by a black circle. The press-fit fixing part 151*f* is provided at a position closer to the mount part 151*d* than an inflection part 151*c* described later. The press-fit fixing part 151*f* is formed in a stationary piece 151*a* and forms a protrusion protruding in the width direction Dw, for example.

Note that the number of press-fit fixing parts 151*f* is not necessarily one, and a plurality of press-fit fixing parts 151*f* may be provided in a range of the signal pin 151 located closer to the mount part 151*d* than the inflection part 151*c*.

As illustrated in FIG. 9, a plurality of grooves 141*d* (the number of which corresponds to the number of contact pins) each extending in the insertion-extraction direction Die are provided over the width direction Dw.

The press-fit fixing part 151*f* of the stationary piece 151*a* is press-fitted in the groove 141*d*, and thereby the signal pin 151 is held by the inner housing 140.

The movable piece 151*b* is a piece from the press-fit fixing part 151*f* to the end (pin tip) on a contact part 151*e* side and includes the inflection part 151*c* and the contact part 151*e*.

Note that the above expression of (a piece) "from the press-fit fixing part 151*f*" in the description of the movable piece 151*b* means in detail that the piece does not include the press-fit fixing part 151*f* and starts from a portion closer to the pin tip adjacent to the press-fit fixing part 151*f*. Thus, the press-fit fixing part 151*f* is a boundary between the stationary piece 151*a* and the movable piece 151*b* and is included in the stationary piece 151*a*. Further, when a plurality of press-fit fixing parts 151*f* are present, the boundary between the stationary piece 151*a* and the movable piece 151*b* is defined as the press-fit fixing part 151*f* that is the closest to the pin tip.

The contact part 151*e* is a portion in contact with the pluggable substrate 22 and curved so as to be convex inward.

The unloaded movable piece 151*b* is inclined inward by the inflection part 151*c* and is deformed so as to be opened outward when the pluggable substrate 22 is inserted in the connector 100.

In the same manner as the signal pin 151 of the third pin group 150, the signal pin 161 of the fourth pin group 160 also has a stationary piece 161*a* including a mount part 161*d* and a press-fit fixing part 161*f* and a movable piece 161*b* including an inflection part 161*c* and a contact part 161*e*.

Further, in the same manner as the signal pin 151 of the third pin group 150, the ground pin 152 of the third pin group 150 also has a stationary piece 152*a* including a mount part 152*d* and a press-fit fixing part 152*f* and a movable piece 152*b* including an inflection part 152*c* and a contact part 152*e*.

Further, in the same manner as the signal pin 151 of the third pin group 150, the ground pin 162 of the fourth pin group 160 also has a stationary piece 162*a* including a mount part 162*d* and a press-fit fixing part 162*f* and a movable piece 162*b* including an inflection part 162*c* and a contact part 162*e*.

<<Fixing of Outer Housing to Inner Housing>>

As illustrated in FIG. 5, the inner housing 140 holding the third pin group 150 and the fourth pin group 160 is accommodated in the outer housing 110 holding the first pin group 120 and the second pin group 130.

Figure 11:
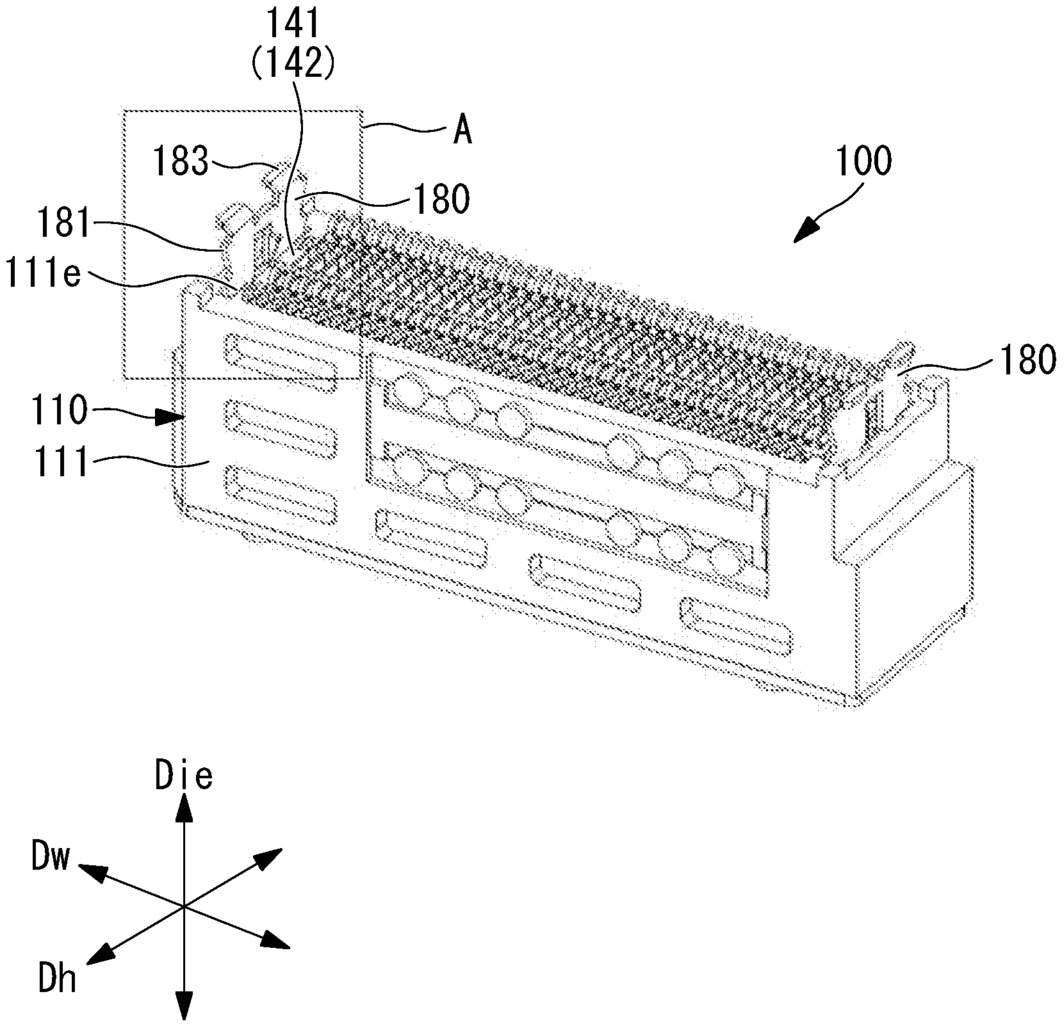
FIG. 11 is a perspective view of a connector according to the first embodiment when viewed from the bottom.
Figure 12:
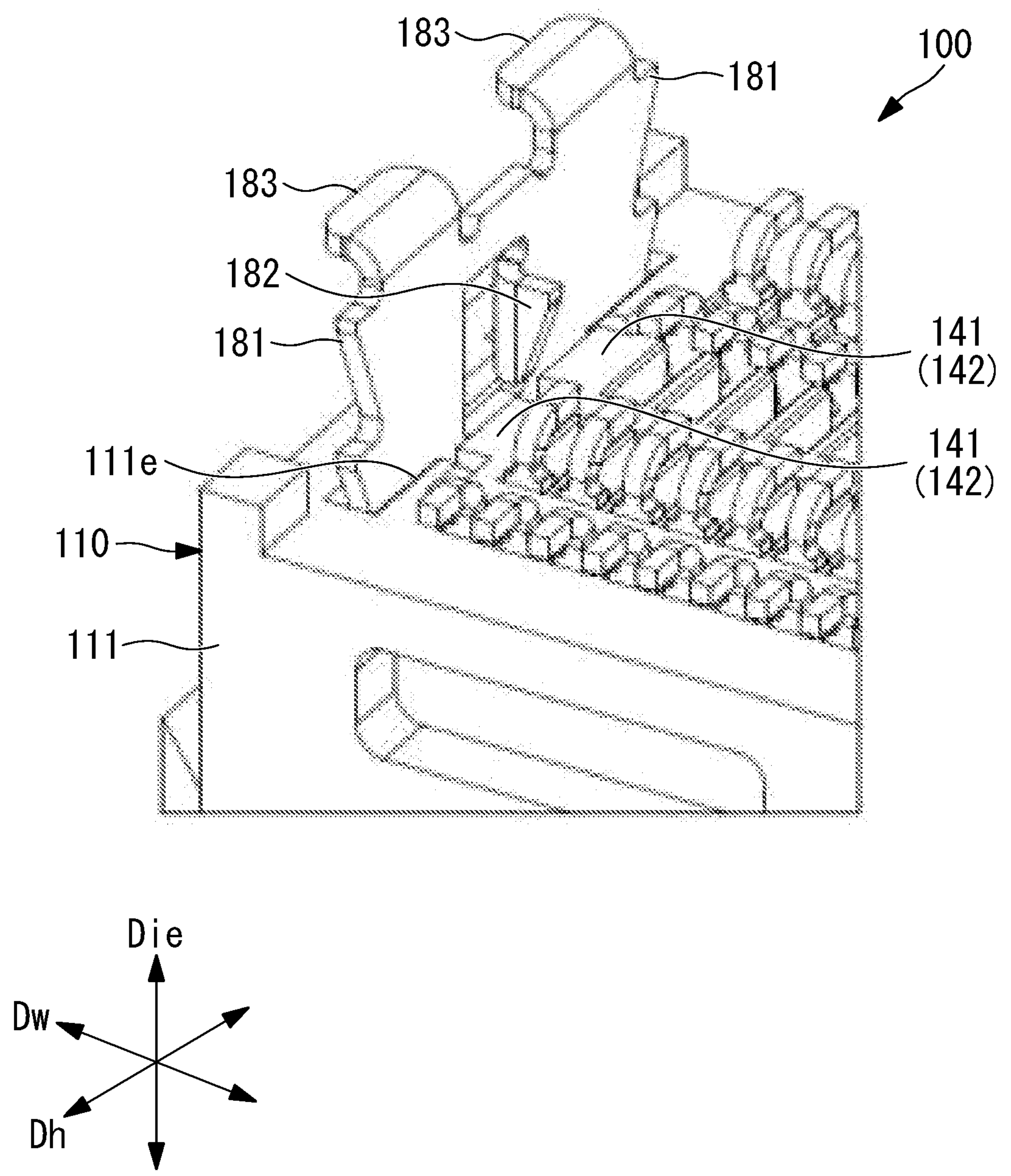
FIG. 12 is a partial enlarged view of a part A illustrated in FIG. 11.

In this state, as illustrated in FIG. 11 and FIG. 12, the fixing tab 180 is provided in a clearance between the outer housing 110 and the inner housing 140 located on both sides in the width direction Dw.

The fixing tab 180 is a component for fixing the outer housing 110 and the inner housing 140 to each other. The fixing tab 180 is preferably made of a metal.

Figure 13:
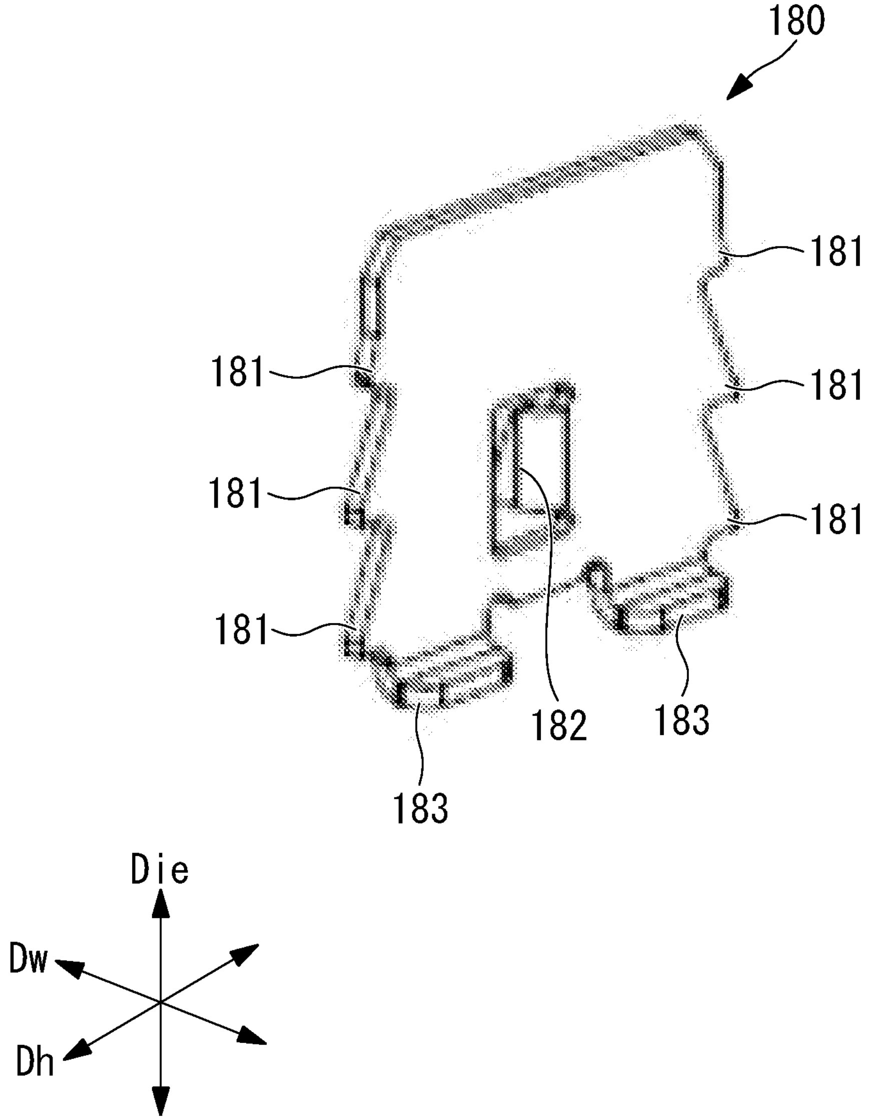
FIG. 13 is a perspective view of a fixing tab.

As illustrated in FIG. 13, the fixing tab 180 has first claws 181 and a second claw 182.

The first claws 181 each are a claw protruding in the height direction Dh. The first claws 181 are provided on both side surfaces of the fixing tab 180.

The second claw 182 is a claw protruding in the width direction Dw. The second claw 182 is formed by cutting and erecting a part of the surface of the fixing tab 180.

Figure 14:
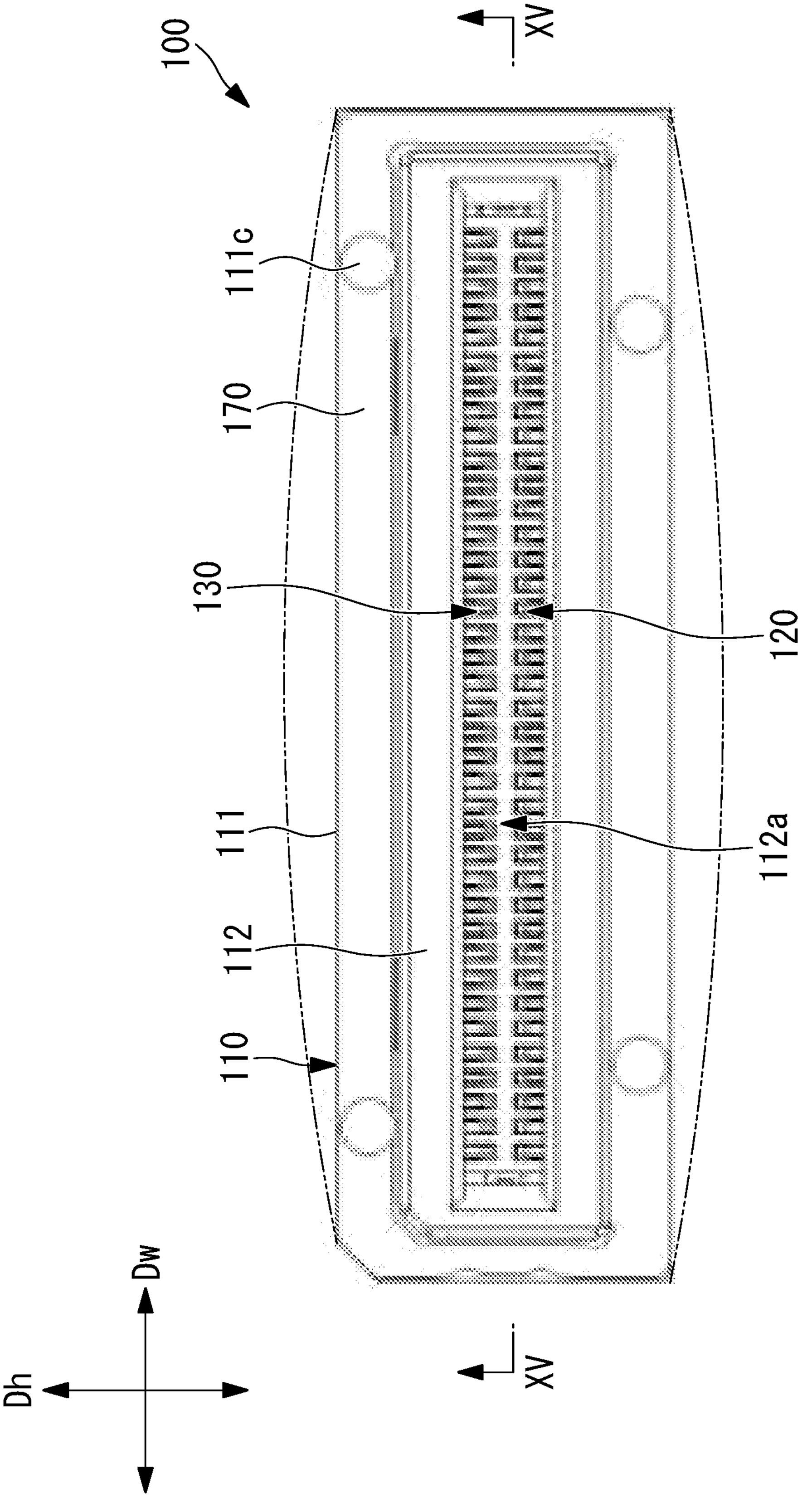
FIG. 14 is a diagram of a connector according to the first embodiment when viewed from an insertion-extraction direction.
Figure 15:
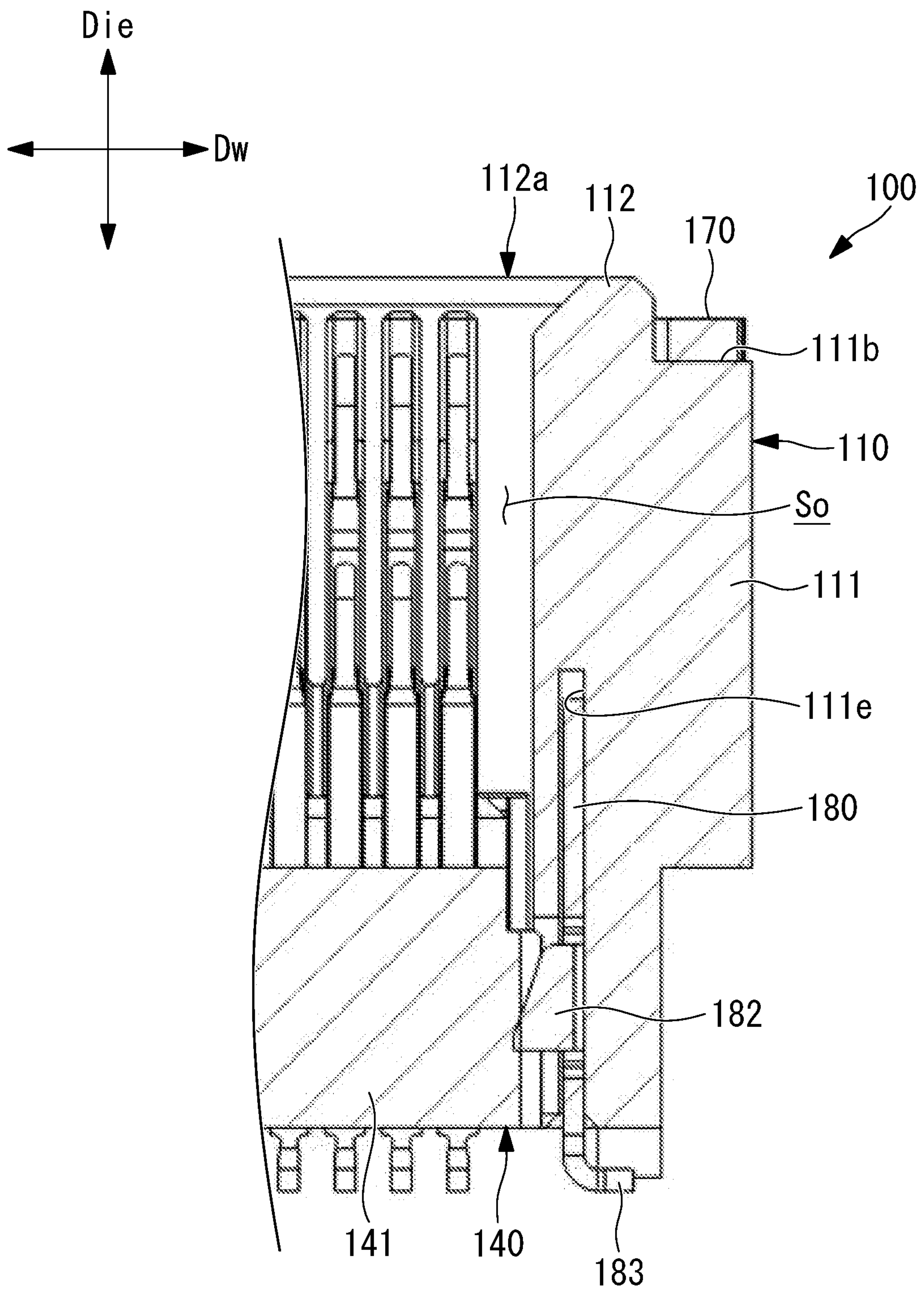
FIG. 15 is a partial sectional view taken along a cutting line XV-XV illustrated in FIG. 14.

FIG. 14 illustrates a view of the connector 100 when viewed from the insertion-extraction direction Die. Further, FIG. 15 illustrates a part of the sectional view taken along the cutting line XV-XV of FIG. 14.

As illustrated in FIG. 12, the first claws 181 of the fixing tab 180 provided in the clearance between the outer housing 110 and the inner housing 140 enter the inner surface of the outer housing 110. In this state, the first claws 181 are guided by a slit 111*e* formed in the inner surface of the outer housing 110. Further, as illustrated in FIG. 12 and FIG. 15, the second claw 182 of the fixing tab 180 provided in the clearance enters the outer surface of the inner housing 140. In this state, the second claw 182 is guided by the narrow groove defined by a pair of protrusion parts 142.

The fixing tab 180 configured as described above is press-fitted in the clearance between the outer housing 110 and the inner housing 140, thereby the outer housing 110 and the inner housing 140 are fixed to each other, and this prevents the inner housing 140 from being fallen out of the outer housing 110.

The tab 183 may be provided on the end edge of the fixing tab 180. The tab 183 is connected to the mount substrate 21.

By joining (for example, soldering) the tab 183 to the mount substrate 21, it is possible to firmly join the connector 100 to the mount substrate 21.

<<Frame>>

Figure 16:
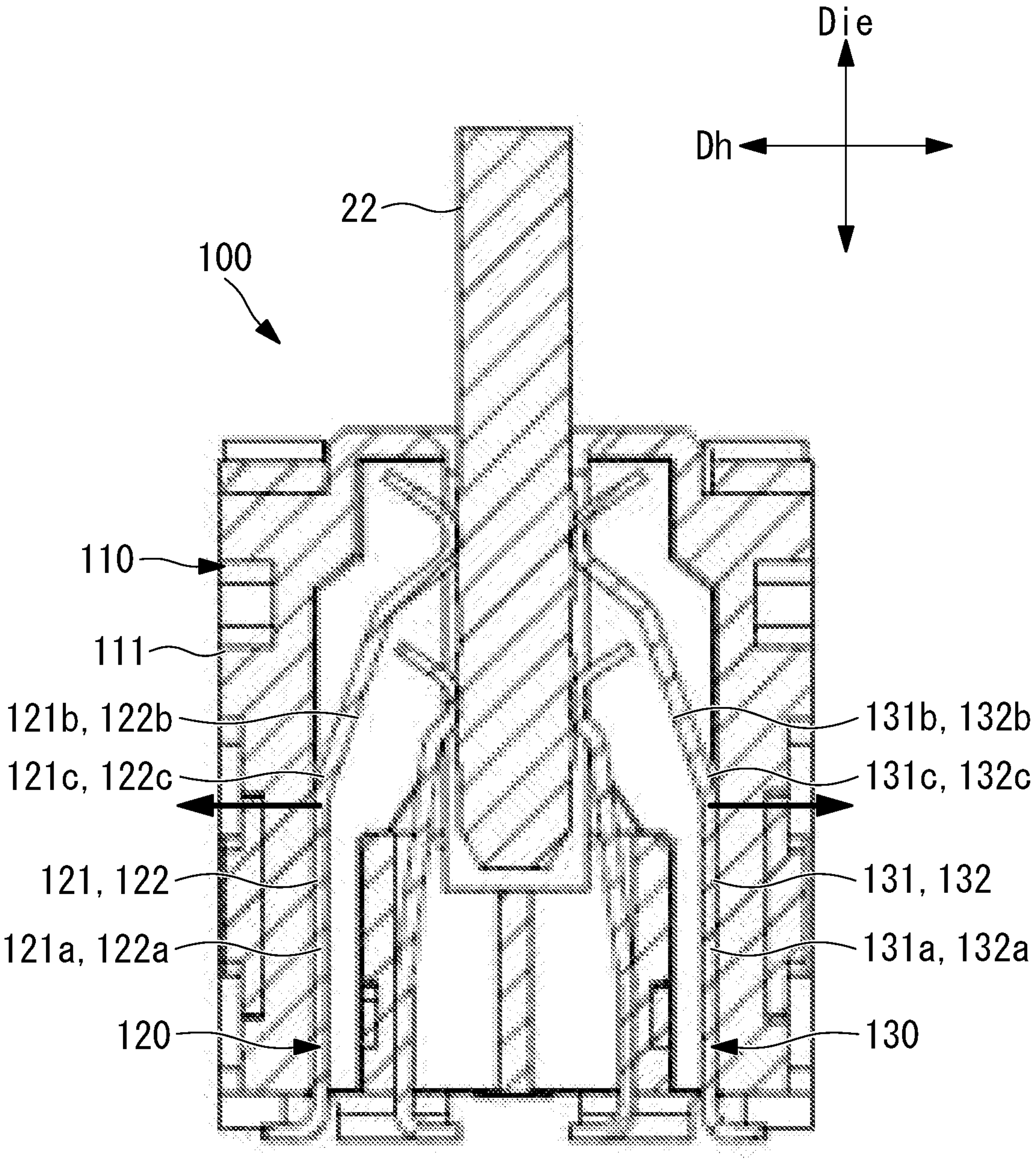
FIG. 16 is a transverse sectional view of the connector according to the first embodiment.

As illustrated in FIG. 8 and FIG. 16, when the pluggable substrate 22 is inserted in the connector 100, the movable piece 121*b* and the movable piece 131*b* are deformed so as to be opened in the direction away from each other (in the height direction Dh) and the movable piece 122*b* and the movable piece 132*b* are deformed so as to be opened in the direction away from each other (in the height direction Dh), and thereby force in both directions away from each other (see the arrow in FIG. 16) is applied to two walls facing each other in the height direction Dh of the outer housing 110. Due to this force from respective contact pins, the stress applied to portions of the walls of the outer housing 110 in contact near the boundary between each stationary piece and each movable piece becomes the largest, and the walls of the outer housing 110 may be deformed as indicated by the two-dot chain line illustrated in FIG. 14. Further, such deformation of the walls of the outer housing 110 may reduce the contact load of each contact pin on the pluggable substrate 22, and this may result in inability of acquiring desired contact performance.

Accordingly, in the present embodiment, the frame 170 as a reinforcing member is provided on the installation surface 111*b* of the outer housing 110.

As illustrated in FIG. 3 and FIG. 6, the frame 170 is an annular plate material surrounding the periphery of the protruding part 112 of the outer housing 110. Specifically, the frame 170 is a rectangular annular plate material having four sides. The frame 170 is made of a metal, for example.

It is preferable that, when viewed from the insertion-extraction direction Die, the shape of the frame 170 substantially match the shape of the installation surface 111*b* (the surface indicated by cross-hatching in FIG. 6). Thus, the frame 170 is fitted into the protruding part 112 with substantially no clearance and is not located out of the installation surface 111*b* in the direction substantially orthogonal to the insertion-extraction direction Die.

With the frame 170 being fitted into the protruding part 112, deformation of the protruding part 112 (deformation in the direction substantially orthogonal to the insertion-extraction direction Die (for example, the height direction Dh)) can be reduced. Further, because deformation of the protruding part 112 is reduced, deformation of the main body 111 connected to the protruding part 112 is also reduced, and as a result, the overall outer housing 110 will be reinforced. Further, because deformation of the outer housing 110 is reduced, a reduction in the contact load of each contact pin on the pluggable substrate 22 can be controlled, and therefore, good contact performance of the connector 100 can be achieved.

As illustrated in FIG. 5, the thickness dimension of the frame 170 is the same as or smaller than the protruding amount of the protruding part 112.

It is preferable that the transverse sectional shape of each side forming the frame 170 be a rectangular shape that is longer in the direction substantially orthogonal to the insertion-extraction direction Die. This can effectively improve the second moment of area in a direction substantially orthogonal to the insertion-extraction direction Die.

As illustrated in FIG. 6, pin holes 171 corresponding to the pins 111*c* provided on the installation surface 111*b* are provided in the frame 170.

As illustrated in FIG. 3 and FIG. 5, in a state where the frame 170 is installed on the installation surface 111*b*, the pins 111*c* are fitted into the pin holes 171. Accordingly, the frame 170 can be positioned to the installation surface 111*b*, and displacement of the outer housing 110 in the direction substantially orthogonal to the insertion-extraction direction Die can be restricted. Thus, the outer housing 110 will be further reinforced.

Note that the frame 170 is not required to be provided in the inner housing 140. This is because, unlike the outer housing 110, it is not necessary to provide the space So for accommodating a component (the inner housing 140) in the inner housing 140 and it is possible to integrally form portions connecting two walls facing each other in the height direction Dh, as illustrated in FIG. 5 and FIG. 9, for example.

In other words, the frame 170 is provided to reinforce the outer housing 110, thereby a large space So can be provided inside the outer housing 110, and this achieves the connector 100 having a two-stage configuration with the outer housing 110 and the inner housing 140.

<Assembly Method of Connector 100>

The connector 100 is assembled in the following procedure, for example.

First, the third pin group 150 and the fourth pin group 160 are press-fitted in the groove 141*d* of the inner housing 140.

Next, the mold 143 is attached to the inner housing 140.

Next, the first pin group 120 and the second pin group 130 are press-fitted in the groove 111*d* of the outer housing 110.

Next, the inner housing 140 in which the third pin group 150 and the fourth pin group 160 are held is inserted in the space So of the outer housing 110 from the bottom opening 111*a*.

Next, the fixing tab 180 is inserted between the outer housing 110 and the inner housing 140 to fix the outer housing 110 and the inner housing 140 to each other.

Next, the mold 113 is attached to the outer housing 110.

Finally, the frame 170 is attached to the outer housing 110 so as to be in close contact with the installation surface 111*b*.

According to the connector 100 and the assembly method of the connector 100 of the present embodiment, the following advantageous effects are achieved.

<Advantageous Effect of Frame>

Deformation of the protruding part 112 that is a part of the outer housing 110 (deformation in the direction substantially orthogonal to the insertion-extraction direction Die) can be reduced by the frame 170. Further, because deformation of the protruding part 112 is reduced, deformation of the main body 111 connected to the protruding part 112 is also reduced, and as a result, the overall outer housing 110 will be reinforced. Further, because deformation of the outer housing 110 is reduced, a reduction in the contact load of each contact pin on the pluggable substrate 22 can be controlled, and therefore, good contact performance of the connector 100 can be achieved.

Further, since the frame 170 is installed on the installation surface 111*b*, the frame 170 can be easily attached to the outer housing 110.

Further, although the installation surface 111*b* is present around the protruding part 112, the frame 170 does not cause an increase in size of the connector 100 when the shape of the frame 170 is designed to be substantially the same as the shape of the installation surface 111*b*. In other words, a compact, thin connector 100 can be achieved. If the frame 170 were attached to the outer circumferential surface of the main body 111, the connector 100 would be increased in size for the thickness of the frame 170.

Further, the transverse sectional shape of each side of the frame 170 is a rectangular shape that is longer in the direction substantially orthogonal to the insertion-extraction direction Die. This can effectively improve the second moment of area in the direction in which the outer housing 110 may be deformed. Thus, the outer housing 110 can be effectively reinforced.

<Advantageous Effect of Fixing Tab>

Since the first claws 181 fixed to the outer housing 110 and the second claw 182 fixed to the inner housing 140 are formed on the fixing tab 180, the outer housing 110 and the inner housing 140 can be fixed to each other by the fixing tab 180 (in detail, the first claws 181 and the second claw 182).

Further, since the tab 183 is formed on the fixing tab 180, by joining the fixing tab 180 to the mount substrate 21, it is possible to firmly join the connector 100 to the mount substrate 21. Further, two functions of the function of fixing the outer housing 110 and the inner housing 140 to each other and the function of firmly joining the connector 100 to the mount substrate 21 can be achieved by the single fixing tab 180. This can reduce the number of components and thus leads to a reduction in the production cost.

<Advantageous Effect of Two-Stage Configuration>

The outer housing 110 in which the first pin group 120 and the second pin group 130 facing each other are held by press-fitting and the inner housing 140 in which the third pin group 150 and the fourth pin group 160 facing each other are held by press-fitting are provided, and the inner housing 140 is accommodated in the outer housing 110. Thus, the manufacturing cost of the connector 100 can be reduced compared to a case where respective pin groups are inserted (insert-molded) in the housing without the housing being divided, for example. Further, the connector 100 can be manufactured relatively simply.

Second Embodiment

A connector and an assembly method of a connector according to a second embodiment of the present invention will be described with reference to the drawings.

Note that, in the following description, substantially the same configurations as those of the first embodiment are labeled with references having common tens digit and ones digit, and the description thereof will be omitted.

<Overview>

As illustrated in FIG. 1, the connector 200 of the present embodiment is a receptacle connector mounted on the mount substrate 11 (first substrate) of the communication system 10.

<Connector 200>

As illustrated in FIG. 1, the connector 200 is a component (a receptacle connector) in which the pluggable substrate 22 is inserted in the insertion-extraction direction Die.

Figure 17:
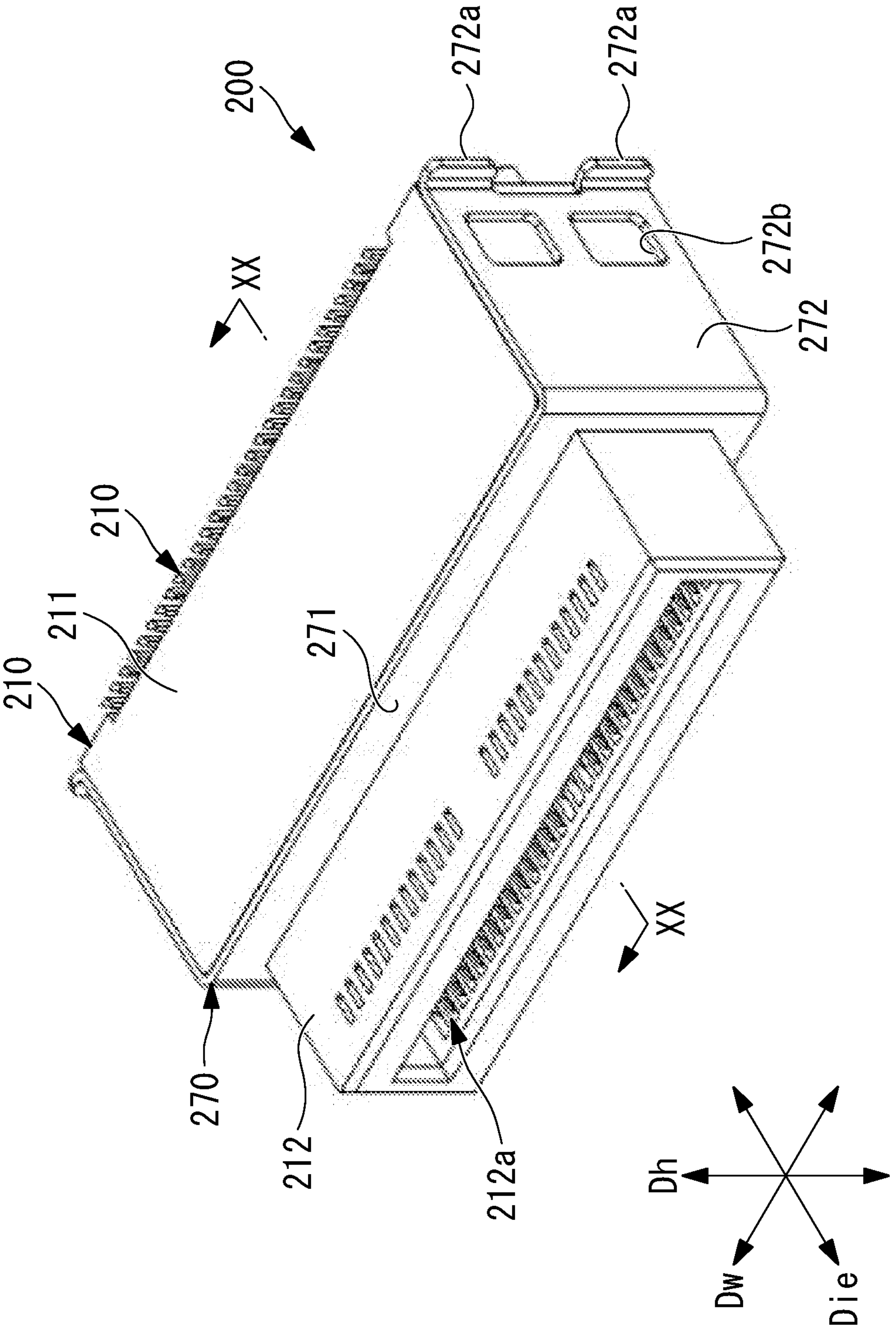
FIG. 17 is a perspective view of a connector according to a second embodiment.
Figure 18:
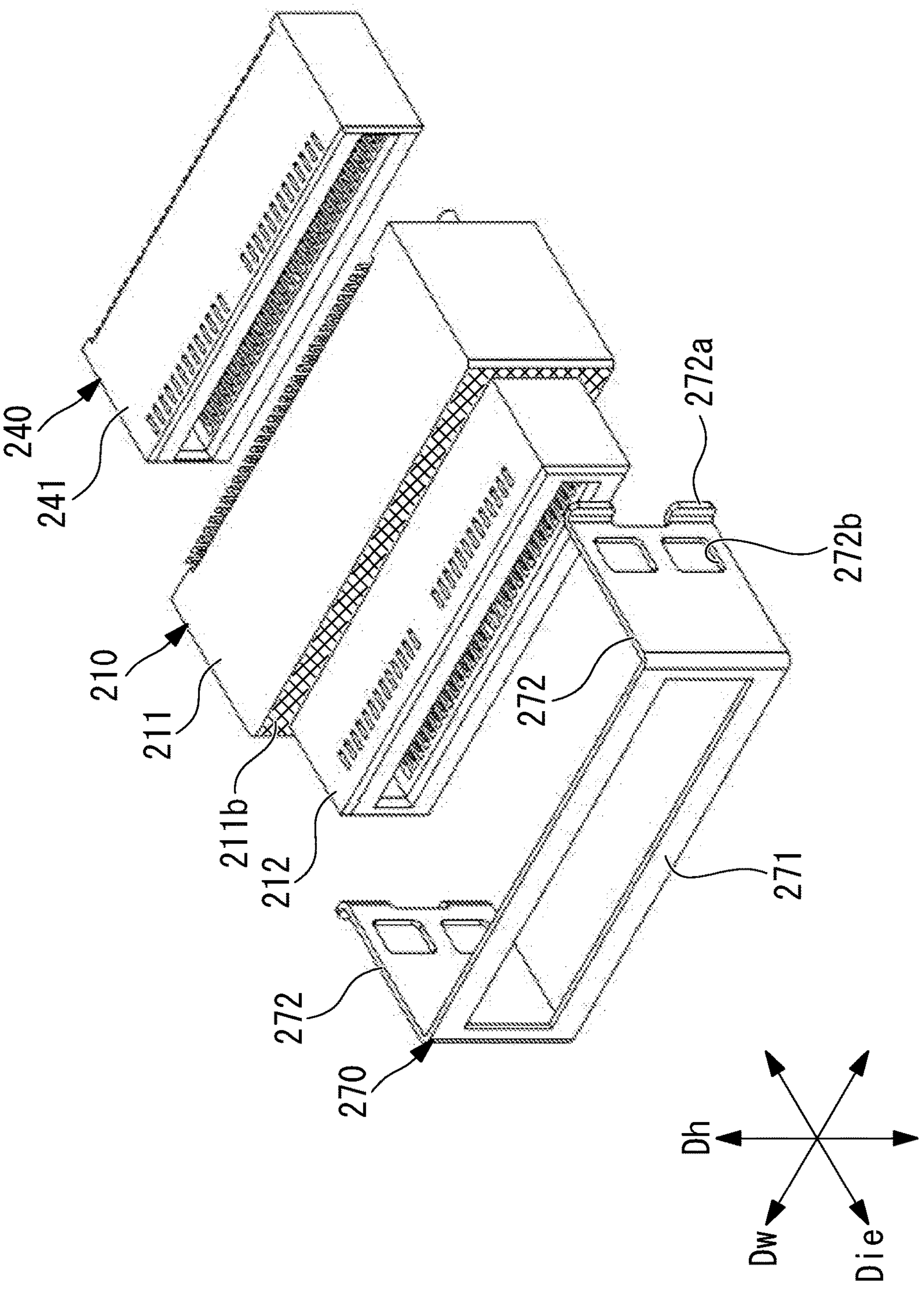
FIG. 18 is an exploded perspective view of the connector according to the second embodiment.
Figure 19:
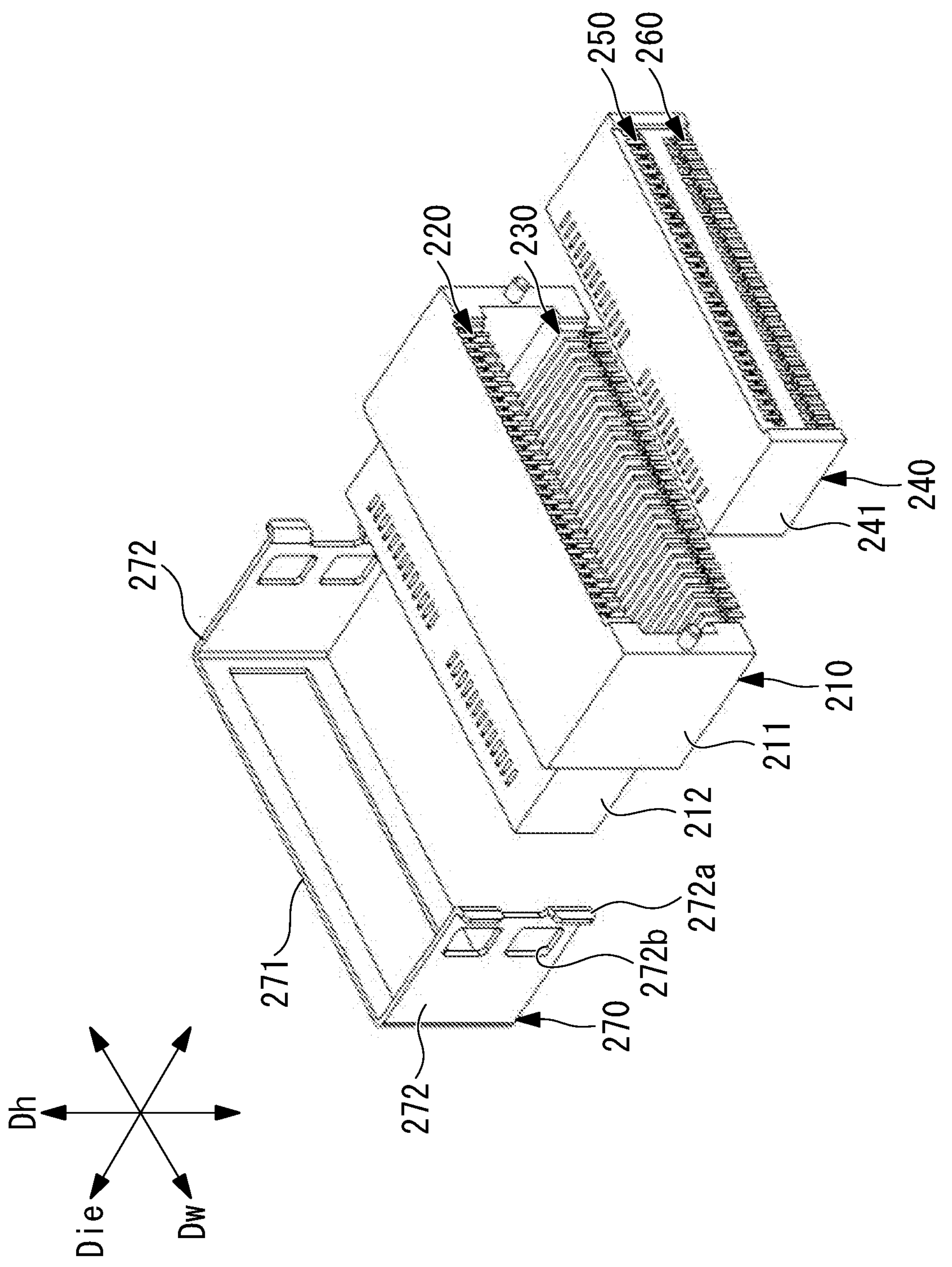
FIG. 19 is an exploded perspective view of the connector according to the second embodiment.
Figure 20:
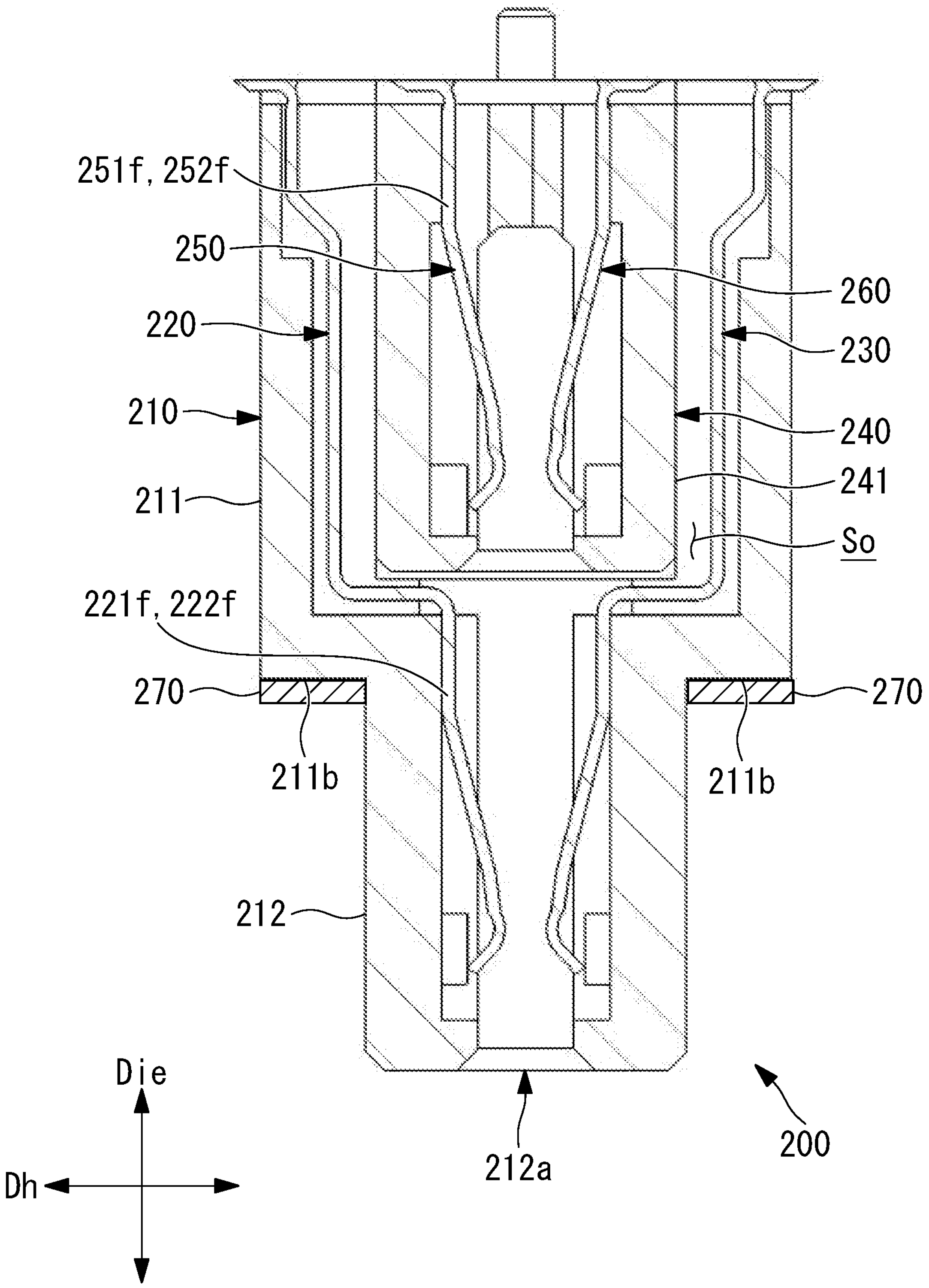
FIG. 20 is a transverse sectional view taken along a cutting line XX-XX illustrated in FIG. 17.

As illustrated in FIG. 17 to FIG. 19, the connector 200 has an outer housing 210, a first pin group 220, a second pin group 230, an inner housing 240, a third pin group 250, a fourth pin group 260, and a reinforcing member 270 and is configured such that the inner housing 240 holding the third pin group 250 and the fourth pin group 260 is accommodated in the outer housing 210 holding the first pin group 220 and the second pin group 230, as illustrated in FIG. 20.

<<Outer Housing>>

As illustrated in FIG. 18 and FIG. 19, the outer housing 210 is a casing having a main body 211 and a protruding part 212 in which a slot opening 212*a* is formed and having a space So defined therein.

In the present embodiment, the protruding amount of the protruding part 212 is about 5 mm to 6 mm.

However, the protruding amount is not limited to this numerical value and can be changed as appropriate in accordance with a specification.

The surface of the main body 211 orthogonal to the insertion-extraction direction Die present around the protruding part 212 is defined as an installation surface 211*b*, and the frame part 271 of the reinforcing member 270 described later is installed thereto. In FIG. 18, the installation surface 211*b* is illustrated by cross-hatching.

Figure 21:
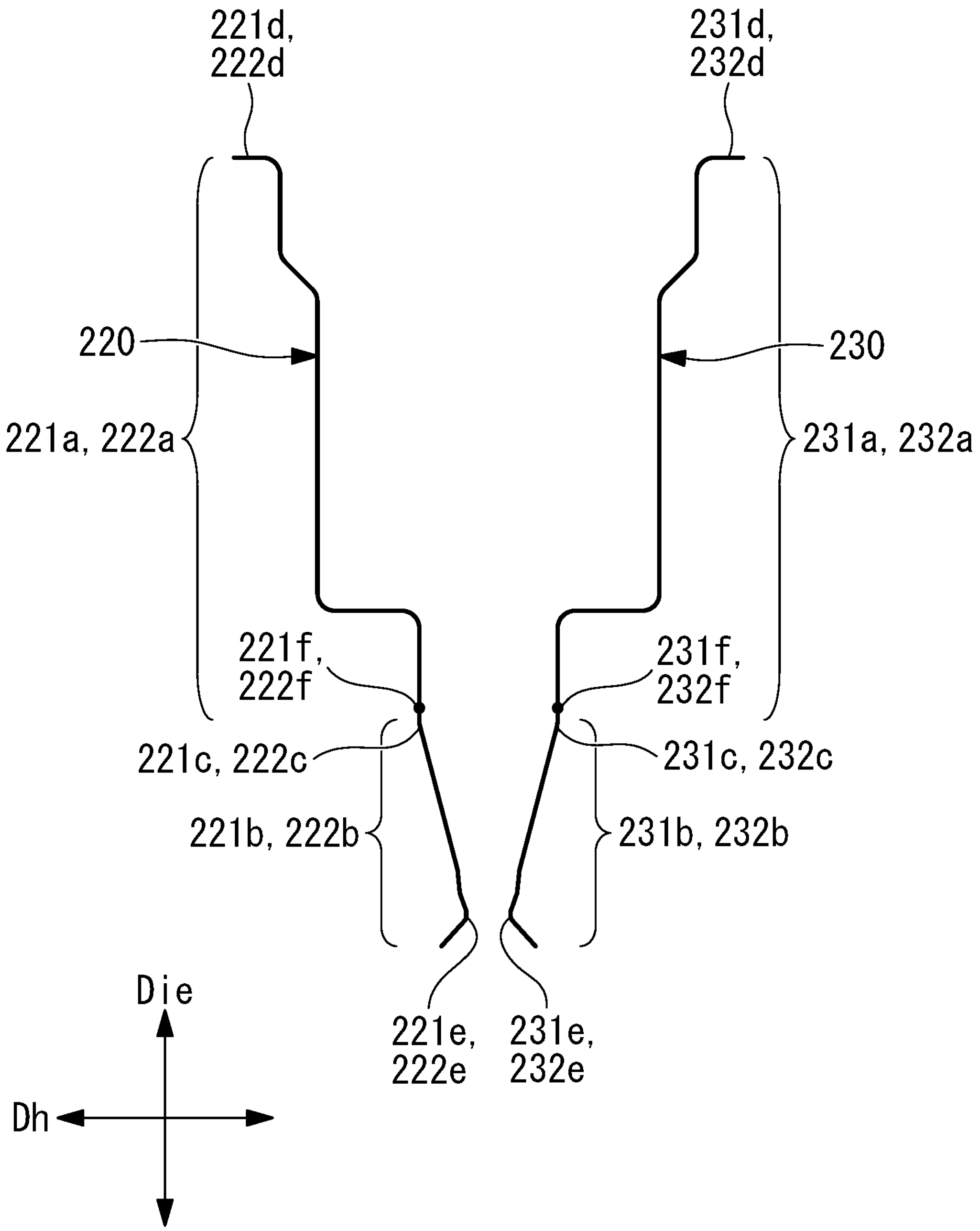
FIG. 21 is a side view of the contact pin held by the outer housing.

As illustrated in FIG. 20 and FIG. 21, when the signal pin 221 of the first pin group 220 is described as an example of a contact pin, for example, the signal pin 221 is a conductive member to ensure conduction between the mount substrate 11 and the pluggable substrate 22 and has a stationary piece 221*a* and a movable piece 221*b*.

As illustrated in FIG. 21, the stationary piece 221*a* is a piece from the terminal end (pin base end) of a mount part 221*d* to a press-fit fixing part 221*f* and includes the mount part 221*d* and the press-fit fixing part 221*f*.

The mount part 221*d* is a portion connected (soldered) to the mount substrate 11 and faces outward.

The press-fit fixing part 221*f* is a portion press-fitted in a groove 211*d* (see FIG. 22) formed in an inner wall of the main body 211. In FIG. 21, the press-fit fixing part 221*f* is indicated by a black circle. The press-fit fixing part 221*f* is provided at a position closer to the mount part 221*d* than an inflection part 221*c* described later. The press-fit fixing part 221*f* is formed in a stationary piece 221*a* and forms a protrusion protruding in the width direction Dw, for example.

Note that the number of press-fit fixing parts 221*f* is not necessarily one, and a plurality of press-fit fixing parts 221*f* may be provided in a range of the signal pin 221 located closer to the mount part 221*d* than the inflection part 221*c*.

Figure 22:
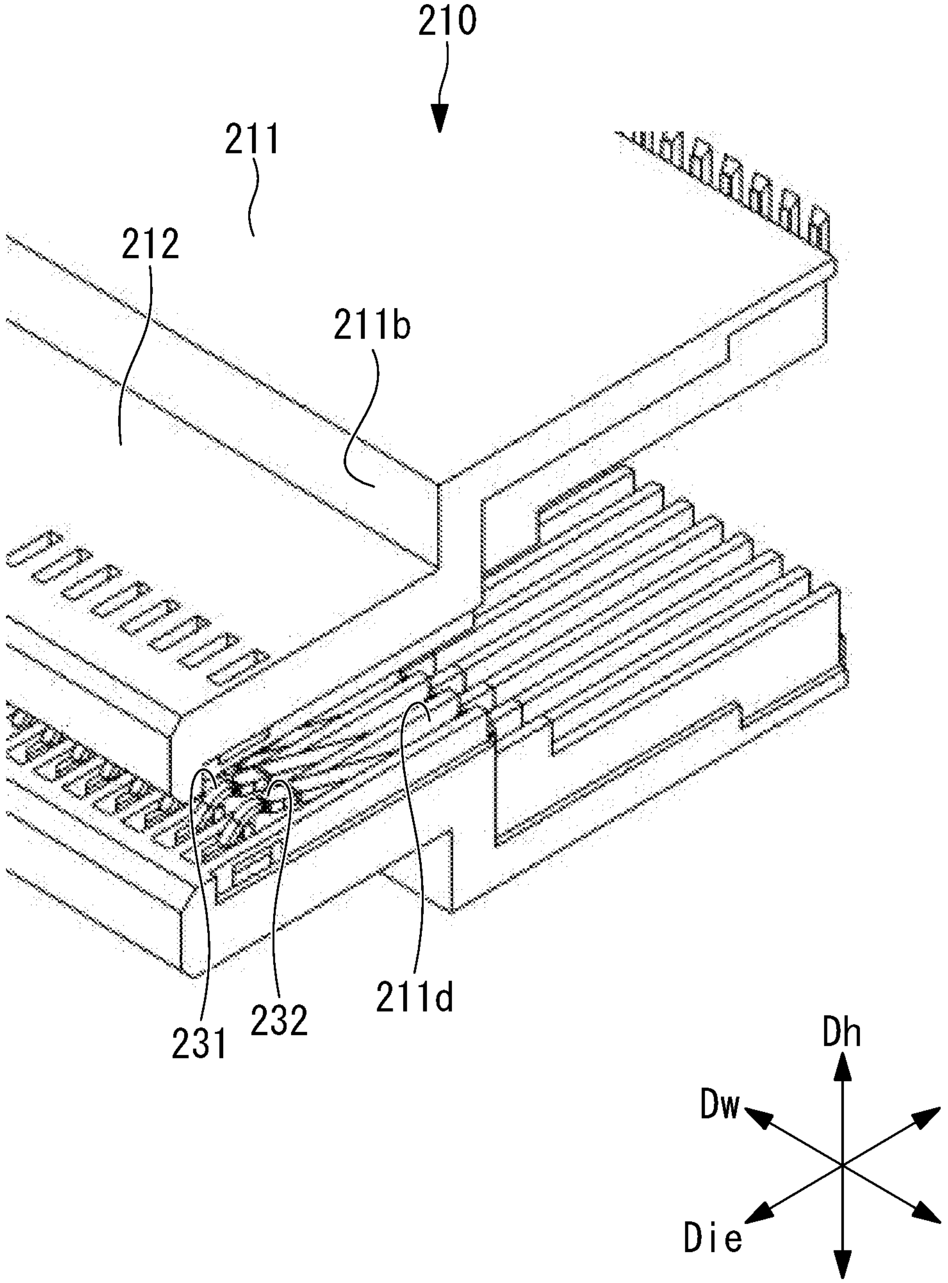
FIG. 22 is a transverse sectional view of the outer housing.

As illustrated in FIG. 22, a plurality of grooves 211*d* (the number of which corresponds to the number of contact pins) each extending in the insertion-extraction direction Die are provided over the width direction Dw.

The press-fit fixing part 221*f* of the stationary piece 221*a* is press-fitted in the groove 211*d*, and thereby the signal pin 221 is held by the outer housing 210.

The movable piece 221*b* is a piece from the press-fit fixing part 221*f* to the end (pin tip) on a contact part 221*e* side and includes the inflection part 221*c* and the contact part 221*e*.

Note that the above expression of (a piece) "from the press-fit fixing part 221*f*" in the description of the movable piece 221*b* means in detail that the piece does not include the press-fit fixing part 221*f* and starts from a portion closer to the pin tip adjacent to the press-fit fixing part 221*f*. Thus, the press-fit fixing part 221*f* is a boundary between the stationary piece 221*a* and the movable piece 221*b* and is included in the stationary piece 221*a*. Further, when a plurality of press-fit fixing parts 221*f* are present, the boundary between the stationary piece 221*a* and the movable piece 221*b* is defined as the press-fit fixing part 221*f* that is the closest to the pin tip.

The contact part 221*e* is a portion in contact with the pluggable substrate 22 and curved so as to be convex inward.

The unloaded movable piece 221*b* is inclined inward by the inflection part 221*c* and is deformed so as to be opened outward when the pluggable substrate 22 is inserted in the connector 200.

In the same manner as the signal pin 221 of the first pin group 220, the signal pin 231 of the second pin group 230 also has a stationary piece 231*a* including a mount part 231*d* and a press-fit fixing part 231*f* and a movable piece 231*b* including an inflection part 231*c* and a contact part 231*e*.

Further, in the same manner as the signal pin 221 of the first pin group 220, the ground pin 222 of the first pin group 220 also has a stationary piece 222*a* including a mount part 222*d* and a press-fit fixing part 222*f* and a movable piece 222*b* including an inflection part 222*c* and a contact part 222*e*.

Further, in the same manner as the signal pin 221 of the first pin group 220, the ground pin 232 of the second pin group 230 also has a stationary piece 232*a* including a mount part 232*d* and a press-fit fixing part 232*f* and a movable piece 232*b* including an inflection part 232*c* and a contact part 232*e*.

<<Inner Housing>>

As illustrated in FIG. 18 and FIG. 19, the inner housing 240 is a casing having a main body 241.

Figure 23:
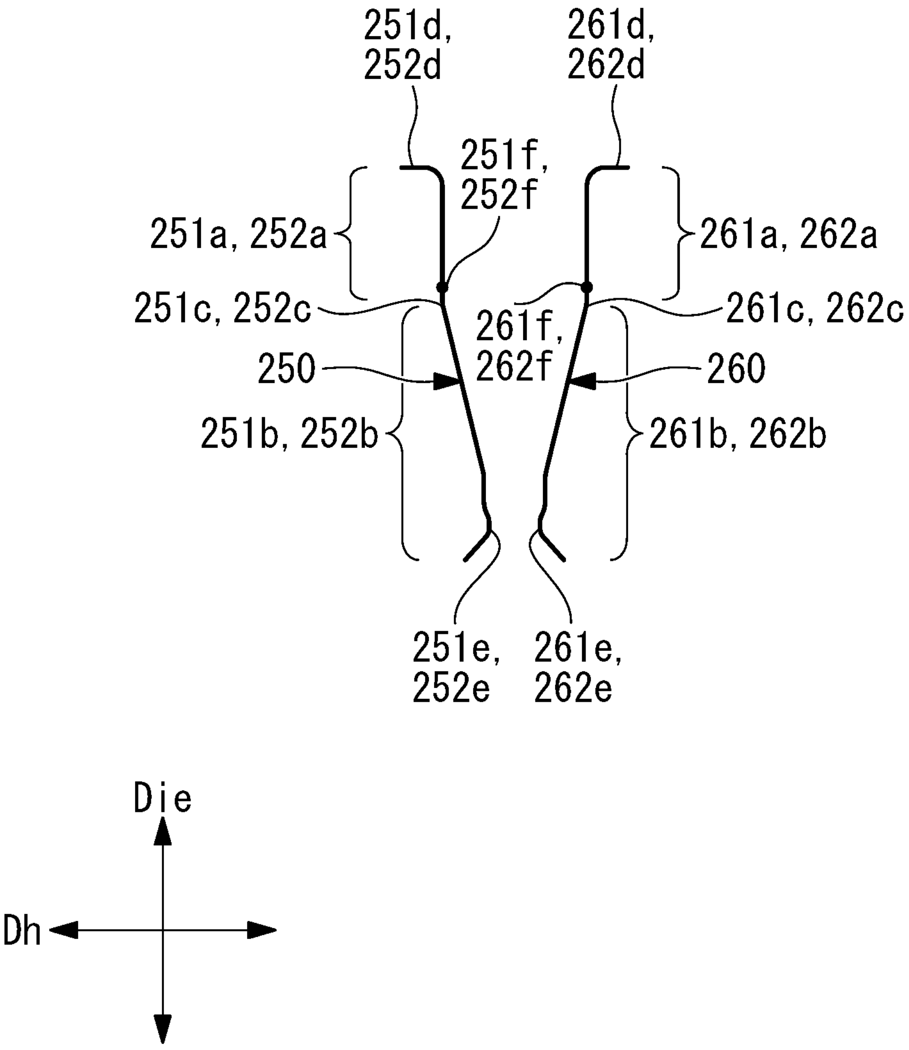
FIG. 23 is a side view of a contact pin held by the inner housing.

As illustrated in FIG. 20 and FIG. 23, when the signal pin 251 of the third pin group 250 is described as an example of a contact pin, for example, the signal pin 251 is a conductive member to ensure conduction between the mount substrate 11 and the pluggable substrate 22 and has a stationary piece 251*a* and a movable piece 251*b*.

As illustrated in FIG. 23, the stationary piece 251*a* is a piece from the terminal end (pin base end) of a mount part 251*d* to a press-fit fixing part 251*f* and includes the mount part 251*d* and the press-fit fixing part 251*f*.

The mount part 251*d* is a portion connected (soldered) to the mount substrate 11 and faces outward.

Figure 24:
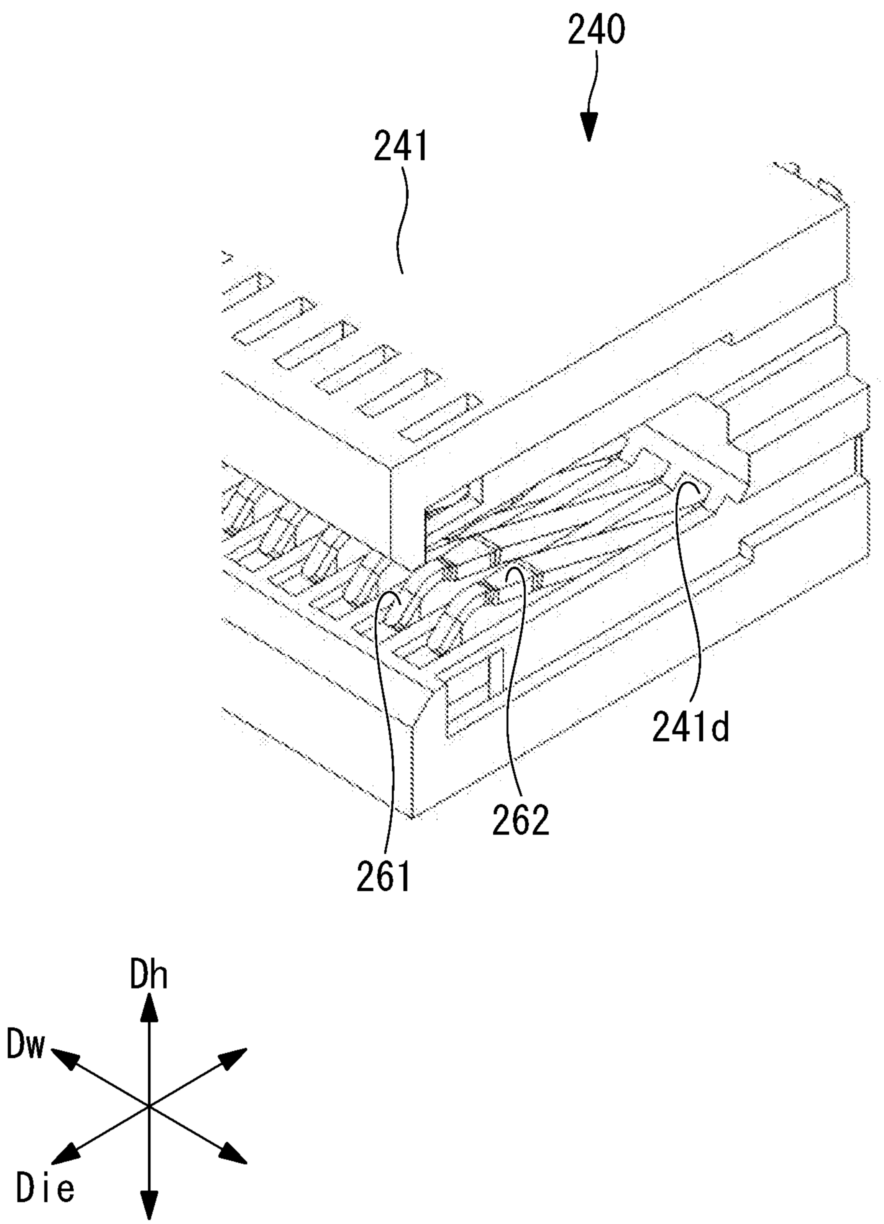
FIG. 24 is a transverse sectional view of the inner housing.

The press-fit fixing part 251*f* is a portion press-fitted in a groove 241*d* (see FIG. 24) formed in an inner wall of the main body 241. In FIG. 23, the press-fit fixing part 251*f* is indicated by a black circle. The press-fit fixing part 251*f* is provided at a position closer to the mount part 251*d* than an inflection part 251*c* described later. The press-fit fixing part 251*f* is formed in a stationary piece 251*a* and forms a protrusion protruding in the width direction Dw, for example.

Note that the number of press-fit fixing parts 251*f* is not necessarily one, and a plurality of press-fit fixing parts 251*f* may be provided in a range of the signal pin 251 located closer to the mount part 251*d* than the inflection part 251*c*.

As illustrated in FIG. 22, a plurality of grooves 241*d* (the number of which corresponds to the number of contact pins) each extending in the insertion-extraction direction Die are provided over the width direction Dw.

The press-fit fixing part 251*f* of the stationary piece 251*a* is press-fitted in the groove 241*d*, and thereby the signal pin 251 is held by the inner housing 240.

The movable piece 251*b* is a piece from the press-fit fixing part 251*f* to the end (pin tip) on a contact part 251*e* side and includes the inflection part 251*c* and the contact part 251*e*.

Note that the above expression of (a piece) "from the press-fit fixing part 251*f*" in the description of the movable piece 251*b* means in detail that the piece does not include the press-fit fixing part 251*f* and starts from a portion closer to the pin tip adjacent to the press-fit fixing part 251*f*. Thus, the press-fit fixing part 251*f* is a boundary between the stationary piece 251*a* and the movable piece 251*b* and is included in the stationary piece 251*a*. Further, when a plurality of press-fit fixing parts 251*f* are present, the boundary between the stationary piece 251*a* and the movable piece 251*b* is defined as the press-fit fixing part 251*f* that is the closest to the pin tip.

The contact part 251*e* is a portion in contact with the pluggable substrate 22 and curved so as to be convex inward.

The unloaded movable piece 251*b* is inclined inward by the inflection part 251*c* and is deformed so as to be opened outward when the pluggable substrate 22 is inserted in the connector 200.

In the same manner as the signal pin 251 of the third pin group 250, the signal pin 261 of the fourth pin group 260 also has a stationary piece 261*a* including a mount part 261*d* and a press-fit fixing part 261*f* and a movable piece 261*b* including an inflection part 261*c* and a contact part 261*e*.

Further, in the same manner as the signal pin 251 of the third pin group 250, the ground pin 252 of the third pin group 250 also has a stationary piece 252*a* including a mount part 252*d* and a press-fit fixing part 252*f* and a movable piece 252*b* including an inflection part 252*c* and a contact part 252*e*.

Further, in the same manner as the signal pin 251 of the third pin group 250, the ground pin 262 of the fourth pin group 260 also has a stationary piece 262*a* including a mount part 262*d* and a press-fit fixing part 262*f* and a movable piece 262*b* including an inflection part 262*c* and a contact part 262*e*.

As illustrated in FIG. 20, the third pin group 250 and the fourth pin group 260 are located between the first pin group 220 and the second pin group 230 and arranged so as to face each other with a predetermined spacing therebetween in the height direction Dh. In this state, for example, the press-fit fixing part 221*f* of the signal pin 221 of the first pin group 220 and the press-fit fixing part 251*f* of the signal pin 251 of the third pin group 250 are arranged on substantially the same straight line along the insertion-extraction direction Die. The same applies to the ground pin 222 and the ground pin 252, the signal pin 231 and the signal pin 261, and the ground pin 232 and the ground pin 262.

<<Reinforcing Member>>

Figure 25:
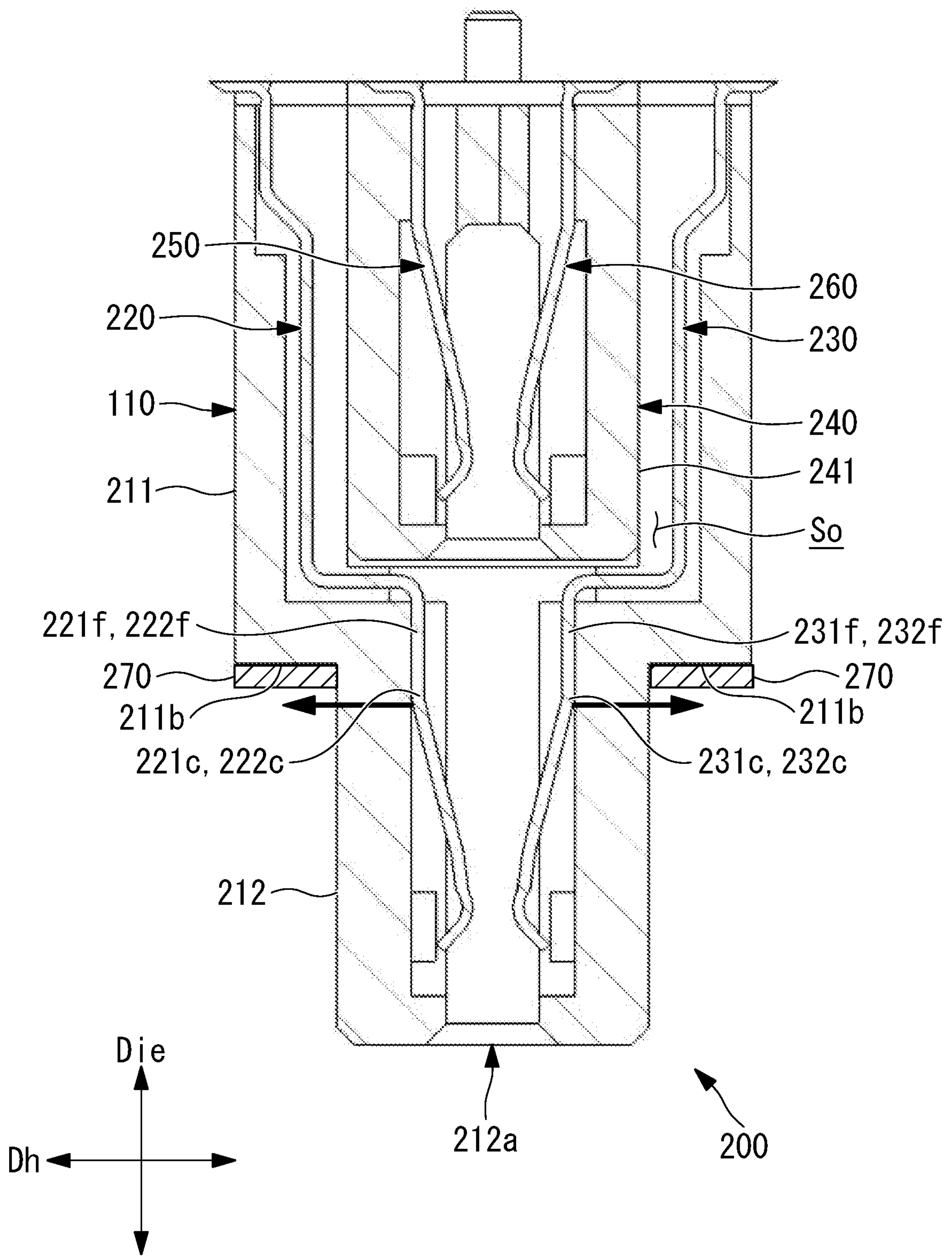
FIG. 25 is a transverse sectional view of the connector according to the second embodiment.

As illustrated in FIG. 25, when the pluggable substrate 22 is inserted in the connector 200, the movable piece 221*b* and the movable piece 231*b* are deformed so as to be opened in the direction away from each other (in the height direction Dh) and the movable piece 222*b* and the movable piece 232*b* are deformed so as to be opened in the direction away from each other (in the height direction Dh), and thereby force in both directions away from each other (see the arrow in FIG. 25) is applied to two walls facing each other in the height direction Dh of the outer housing 210. Due to this force from respective contact pins, the stress applied to portions of the walls of the outer housing 210 in contact near the boundary between each stationary piece and each movable piece becomes the largest, and the walls of the outer housing 210 may be deformed. Further, such deformation of the walls of the outer housing 210 may reduce the contact load of each contact pin on the pluggable substrate 22, and this may result in inability of acquiring desired contact performance.

Figure 26:
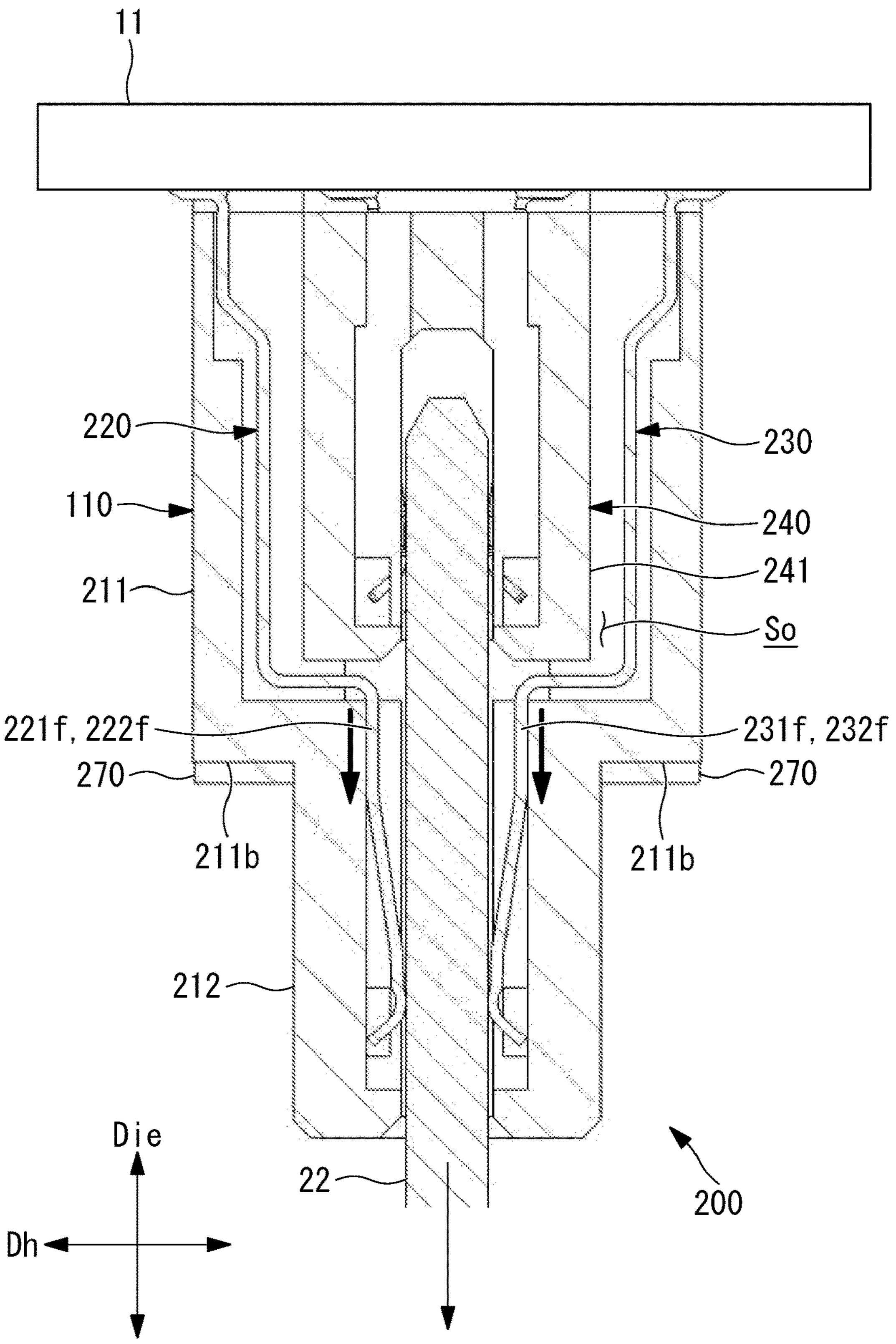
FIG. 26 is a transverse sectional view of the connector according to the second embodiment.

Further, as illustrated in FIG. 26, when the pluggable substrate 22 is extracted out of the connector 200, respective contact pins of the first pin group 220 and the second pin group 230 are pulled in the same direction as the extraction direction due to the friction against the pluggable substrate 22, and the outer housing 210 subjected to the force is also pulled in the same direction as the extraction direction. As a result, the application of force in the direction in which the connector 200 is lifted up from the mount substrate 11 may damage (for example, may cause a crack in) a connecting part between each mount part of each contact pin and the mount substrate 11.

Accordingly, the reinforcing member 270 is provided in the connector 200 of the present embodiment.

As illustrated in FIG. 17 and FIG. 18, the reinforcing member 270 has the frame part 271 and side parts 272. The reinforcing member 270 is made of a metal, for example.

The frame part 271 is an annular plate material surrounding the periphery of the protruding part 212 of the outer housing 210. Specifically, the frame part 271 is a rectangular annular plate material having four sides.

It is preferable that, when viewed from the insertion-extraction direction Die, the shape of the frame part 271 substantially match the shape of the installation surface 211*b* (the surface indicated by cross-hatching in FIG. 18). Thus, the frame part 271 is fitted into the protruding part 212 with substantially no clearance and is not located out of the installation surface 211*b* in the direction substantially orthogonal to the insertion-extraction direction Die.

With the frame part 271 being fitted into the protruding part 212, deformation of the protruding part 212 (deformation in the direction substantially orthogonal to the insertion-extraction direction Die (for example, the height direction Dh)) can be reduced. Further, because deformation of the protruding part 212 is reduced, deformation of the main body 211 connected to the protruding part 212 is also reduced, and as a result, the overall outer housing 210 will be reinforced. Further, because deformation of the outer housing 210 is reduced, a reduction in the contact load of each contact pin on the pluggable substrate 22 can be controlled, and therefore, good contact performance of the connector 200 can be achieved.

It is preferable that positions in the installation surface 211*b* to which the frame part 271 is installed correspond to the positions near the press-fit fixing part 221*f*, near the press-fit fixing part 231*f*, near the press-fit fixing part 222*f*, and near the press-fit fixing part 232*f* in the insertion-extraction direction Die. Accordingly, deformation of a portion of the outer housing 210 where force from each contact pin works most significantly can be reduced by the frame part 271.

It is preferable that the transverse sectional shape of each side forming the frame part 271 be a rectangular shape that is longer in the direction substantially orthogonal to the insertion-extraction direction Die. This can effectively improve the second moment of area in a direction substantially orthogonal to the insertion-extraction direction Die.

The side parts 272 are connected to two opposing sides of the frame part 271 (respective shorter sides of the rectangle in the case of FIG. 18).

Each side part 272 is a square plate material and is connected so as to be bent at substantially a right angle relative to the frame part 271. Thus, the side part 272 expands in a plane substantially orthogonal to the width direction Dw relative to the frame part 271 expanding in a plane substantially orthogonal to the insertion-extraction direction Die and extends along the side surface of the main body 211.

Tabs 272*a* are provided on the free edge of the side part 272. The tabs 272*a* are connected to the mount substrate 11.

By joining (for example, soldering) the tabs 272*a* to the mount substrate 11, it is possible to firmly join the connector 200 to the mount substrate 11. Accordingly, when extracting the pluggable substrate 22 out of the connector 200, it is possible to prevent a connecting part between each mount part of each contact pin and the mount substrate 11 from being damaged (for example, from a crack occurring) by the application of force in the direction in which the connector 200 is lifted up from the mount substrate 11. Furthermore, when the pluggable substrate 22 is inserted in the connector 200, collapsing of the connector 200 due to prying, damage to the solder connecting part, or the like can be avoided.

Note that the method of connecting the tab 272*a* and the mount substrate 11 is not limited to soldering and may be joined by a conductive paste, an anisotropic conductive film (ACF), or the like or may be mechanically fixed by a screw or the like, for example.

Holes 272*b* are provided in the side part 272. In the case of FIG. 18, two square holes 272*b* are provided in one side part 272.

This hole 272*b* is for less transferring heat from the tab 272*a* to the frame part 271 via the side part 272 when soldering the tabs 272*a* to the mount substrate 11. Thus, the holes 272*b* are provided to reduce the sectional area of the side part 272 as a heat transfer path. This enables good soldering.

The size, the shape, the number, and the like of holes 272*b* are designed as appropriate by taking the strength required for the side part 272 into consideration.

According to the connector 200 of the present embodiment, the following advantageous effects are achieved.

<Advantageous Effect of Reinforcing Member>

Deformation of the protruding part 212 that is a part of the outer housing 210 (deformation in the direction substantially orthogonal to the insertion-extraction direction Die) can be reduced by the frame part 271. Further, because deformation of the protruding part 212 is reduced, deformation of the main body 211 connected to the protruding part 212 is also reduced, and as a result, the overall outer housing 210 will be reinforced. Further, because deformation of the outer housing 210 is reduced, a reduction in the contact load of each contact pin on the pluggable substrate 22 can be controlled, and therefore, good contact performance of the connector 200 can be achieved. Further, since the frame part 271 is installed on the installation surface 211*b*, the frame part 271 can be easily attached to the outer housing 210.

Further, while the installation surface 211*b* is present around the protruding part 212, the frame part 271 does not cause an increase in size of the connector 200 when the shape of the frame part 271 is designed to be substantially the same as the shape of the installation surface 211*b*. In other words, a compact, thin connector 200 can be achieved. If the frame part 271 were attached to the outer circumferential surface of the main body 211, the connector 200 would be increased in size for the thickness of the frame part 271.

Further, the transverse sectional shape of each side of the frame part 271 is a rectangular shape that is longer in the direction substantially orthogonal to the insertion-extraction direction Die. This can effectively improve the second moment of area in the direction in which the outer housing 110 may be deformed. Thus, the outer housing 210 can be effectively reinforced.

Further, the positions in the frame part 271 correspond to the positions near the press-fit fixing part 221*f*, near the press-fit fixing part 231*f*, near the press-fit fixing part 222*f*, and near the press-fit fixing part 232*f* of each contact pin in the insertion-extraction direction Die. This can reinforce the portion of the housing that is most significantly subjected to the force from each contact pin.

Further, since the tab 272*a* is formed on the free end of the side part 272, it is possible to firmly join the connector 200 to the mount substrate 11 by joining the tab 272*a* to the mount substrate 11.

Further, when extracting the pluggable substrate 22 out of the connector 200, it is possible to prevent a connecting part between each mount part of each contact pin and the mount substrate 11 from being damaged (for example, from a crack occurring) by the application of force in the direction in which the connector 200 is lifted up away from the mount substrate 11. Furthermore, when the pluggable substrate 22 is inserted in the connector 200, collapsing of the connector 200 due to prying, damage to the solder connecting part, or the like can be avoided.

Further, since at least one hole 272*b* is formed in the side part 272, when the tab 272*a* is soldered to the mount substrate 11, the amount of heat transferred from the tab 272*a* to the frame part 271 via the side part 272 can be reduced. This enables good soldering.

<Advantageous Effect of Two-Stage Configuration>

The outer housing 210 held in which the first pin group 220 and the second pin group 230 facing each other are held by press-fitting and the inner housing 240 in which the third pin group 250 and the fourth pin group 260 facing each other are held by press-fitting are provided, and the inner housing 240 is accommodated in the outer housing 210. Thus, the manufacturing cost of the connector 200 can be reduced compared to a case where respective pin groups are inserted (insert-molded) in the housing without the housing being divided, for example. Further, the connector 200 can be manufactured relatively simply.

What is claimed is:

1. A connector that is mounted on an external first substrate and in or from which an external second substrate is inserted or extracted in an insertion-extraction direction, the connector comprising:

a pin group in which a plurality of contact pins are aligned;

a housing holding the pin group; and a reinforcing member attached to the housing, wherein the housing has a main body and a protruding part protruding in the insertion-extraction direction from the main body, a slot opening in or from which the second substrate is inserted or extracted being formed in the protruding part, wherein the main body has an installation surface surrounding a whole circumference of the protruding part and being substantially orthogonal to the insertion-extraction direction, and wherein the reinforcing member has a plate-like frame part installed on the installation surface of the main body and having an annular shape.

2. The connector according to claim 1, wherein the reinforcing member has a plate-like side part extending along a side surface of the main body, wherein a base end of the side part is connected to the frame part, and wherein a tab to be connected to the first substrate is formed on a free end of the side part.

3. The connector according to claim 2, wherein the reinforcing member is made of a metal, and wherein the tab is soldered to the first substrate.

4. The connector according to claim 3, wherein at least one hole is formed in the side part.

5. The connector according to claim 1, wherein a position of the frame part corresponds to a position near a portion of the contact pin press-fitted in the housing in the insertion-extraction direction.

6. The connector according to claim 1, wherein the frame part has a square shape having four sides, and wherein a transverse sectional shape of each of the sides is a rectangular shape that is longer in a direction substantially orthogonal to the insertion-extraction direction.

7. The connector according to claim 1, wherein the pin group includes a first pin group, a second pin group, a third pin group, and a fourth pin group, wherein the housing includes an outer housing in which the first pin group and the second pin group facing each other are held by press-fitting and an inner housing in which the third pin group and the fourth pin group facing each other are held by press-fitting, wherein the inner housing is accommodated in the outer housing, and wherein the outer housing has the protruding part and the main body.

8. The connector according to claim 7 further comprising a plate-like fixing tab provided between the outer housing and the inner housing, wherein a first claw fixed to the outer housing and a second claw fixed to the inner housing are formed on the fixing tab.

9. The connector according to claim 8, wherein a tab to be connected to the first substrate is formed on the fixing tab.

10. The connector according to claim 9, wherein the fixing tab is made of a metal, and wherein the tab is soldered to the first substrate.

11. A connector comprising:

a first pin group, a second pin group, a third pin group, and a fourth pin group each including a plurality of aligned contact pins;

an outer housing in which the first pin group and the second pin group extending in a first direction and facing each other are held by press-fitting; and an inner housing in which the third pin group and the fourth pin group facing each other are held by press-fitting, wherein the inner housing is accommodated in the outer housing, wherein the third pin group and the fourth pin group extend in the first direction and are located between the first pin group and the second pin group, and are arranged to face each other with a predetermined spacing orthogonal to the first direction.

12. The connector according to claim 11 further comprising a plate-like fixing tab provided between the outer housing and the inner housing, wherein a first claw fixed to the outer housing and a second claw fixed to the inner housing are formed on the fixing tab.

13. The connector according to claim 12, wherein a tab to be connected to a first substrate is formed on the fixing tab.

14. The connector according to claim 13, wherein the fixing tab is made of a metal, and wherein the tab is soldered to the first substrate.

15. An assembly method of a connector comprising a first pin group, a second pin group, a third pin group, and a fourth pin group each including a plurality of aligned contact pins, an outer housing holding the first pin group and the second pin group extending in a first direction and facing each other, and an inner housing holding the third pin group and the fourth pin group facing each other, the assembly method comprising:

press-fitting the first pin group and the second pin group in the outer housing;

press-fitting the third pin group and the fourth pin group in the inner housing; and inserting the inner housing holding the third pin group and the fourth pin group in the outer housing holding the first pin group and the second pin group wherein the third pin group and the fourth pin group extend in the first direction and are located between the first pin group and the second pin group, and are arranged to face each other with a predetermined spacing orthogonal to the first direction.

* * * * *